(12) United States Patent
McCullough et al.

(10) Patent No.: US 8,358,281 B2
(45) Date of Patent: Jan. 22, 2013

(54) DEVICE, METHOD, AND GRAPHICAL USER INTERFACE FOR MANAGEMENT AND MANIPULATION OF USER INTERFACE ELEMENTS

(75) Inventors: Ian Patrick McCullough, Wilkinsburg, PA (US); Peter Glen Berger, Irwin, PA (US)

(73) Assignee: Apple Inc., Cuptertino, CA (US)

( * ) Notice: Subject to any disclaimer, the term of this patent is extended or adjusted under 35 U.S.C. 154(b) by 399 days.

(21) Appl. No.: 12/638,736

(22) Filed: Dec. 15, 2009

(65) Prior Publication Data

US 2011/0141031 A1    Jun. 16, 2011

(51) Int. Cl.
*G06F 3/041* (2006.01)
*G06F 3/01* (2006.01)

(52) U.S. Cl. ........................................ 345/173
(58) Field of Classification Search ............... 345/173
See application file for complete search history.

(56) References Cited

U.S. PATENT DOCUMENTS

| | | | |
|---|---|---|---|
| 5,319,386 A | 6/1994 | Gunn et al. | 345/173 |
| 5,589,856 A | 12/1996 | Stein et al. | 345/173 |
| 5,736,974 A | 4/1998 | Selker | 345/146 |
| 5,754,873 A | 5/1998 | Nolan | |
| 5,910,800 A | 6/1999 | Shields et al. | 345/336 |
| 6,037,939 A | 3/2000 | Kashiwagi et al. | 345/342 |
| 6,049,326 A | 4/2000 | Beyda et al. | 345/157 |
| 6,073,036 A | 6/2000 | Heikkinen et al. | 455/575 |
| 6,323,846 B1 | 11/2001 | Westerman et al. | 345/173 |
| 6,411,283 B1 | 6/2002 | Murphy | 345/173 |
| 6,570,557 B1 | 5/2003 | Westerman et al. | 345/173 |
| 6,677,932 B1 | 1/2004 | Westerman | 345/173 |
| 6,888,536 B2 | 5/2005 | Westerman et al. | 345/173 |
| 7,075,512 B1 | 7/2006 | Fabre et al. | 345/156 |
| 7,218,226 B2 | 5/2007 | Wehrenberg | 340/571 |
| 7,614,008 B2 | 11/2009 | Ording | 715/773 |

(Continued)

FOREIGN PATENT DOCUMENTS

| | | |
|---|---|---|
| EP | 0 795 811 A1 | 9/1997 |
| EP | 1 674 976 A2 | 6/2006 |

(Continued)

OTHER PUBLICATIONS

Lee, S.K. et al., "A Multi-Touch Three Dimensional Touch-Sensitive Tablet," CHI 85 Proceedings, Apr. 1985, pp. 21-25.

(Continued)

*Primary Examiner* — Fred Tzeng
(74) *Attorney, Agent, or Firm* — Fletcher Yoder PC

(57) ABSTRACT

Context-sensitive, automated use of a magnification loupe is disclosed to facilitate management and manipulation of user interface content and small user interface elements via gestures on a touch-sensitive surface. In one embodiment, a magnifying loupe is displayed based on the context associated with a finger-based gesture on a touch-sensitive surface. For example, a magnification loupe is displayed when one or more user interface elements corresponding to the location of the gesture on the touch-sensitive surface is smaller than a predefined size threshold, but the loupe is not displayed when the user interface elements corresponding to the location of the gesture on the touch-sensitive surface are larger than the predefined size threshold. In another embodiment, the magnification power of the loupe varies based on the size of the one or more user interface elements corresponding to the location of the gesture on the touch-sensitive surface.

20 Claims, 21 Drawing Sheets

U.S. PATENT DOCUMENTS

| | | | |
|---|---|---|---|
| 7,633,076 B2 | 12/2009 | Huppi et al. | 250/559.36 |
| 7,653,883 B2 | 1/2010 | Hotelling et al. | 715/863 |
| 7,657,849 B2 | 2/2010 | Chaudhri et al. | 715/863 |
| 7,663,607 B2 | 2/2010 | Hotelling et al. | 345/173 |
| 7,688,306 B2 | 3/2010 | Wehrenberg et al. | 345/158 |
| 7,694,231 B2 | 4/2010 | Kocienda et al. | 715/773 |
| 7,739,259 B2 * | 6/2010 | Hartwell et al. | 707/706 |
| 7,966,573 B2 * | 6/2011 | Dodge et al. | 715/815 |
| 2001/0040587 A1 | 11/2001 | Scheck | 345/676 |
| 2002/0067346 A1 | 6/2002 | Mouton | 345/173 |
| 2002/0080123 A1 | 6/2002 | Kennedy et al. | 345/173 |
| 2002/0180763 A1 | 12/2002 | Kung | 345/660 |
| 2003/0063073 A1 | 4/2003 | Geaghan et al. | 345/173 |
| 2004/0135818 A1 | 7/2004 | Thomson et al. | 345/823 |
| 2004/0155888 A1 | 8/2004 | Padgitt et al. | 345/619 |
| 2004/0160419 A1 | 8/2004 | Padgitt | 345/173 |
| 2004/0196267 A1 | 10/2004 | Kawai et al. | 345/173 |
| 2004/0196310 A1 | 10/2004 | Aamodt et al. | |
| 2005/0024341 A1 | 2/2005 | Gillespie et al. | 345/173 |
| 2005/0093826 A1 | 5/2005 | Huh | 345/168 |
| 2005/0190147 A1 | 9/2005 | Kim | 345/156 |
| 2006/0001654 A1 | 1/2006 | Smits | 345/176 |
| 2006/0022955 A1 | 2/2006 | Kennedy | 345/173 |
| 2006/0026521 A1 | 2/2006 | Hotelling et al. | 715/702 |
| 2006/0026535 A1 | 2/2006 | Hotelling et al. | 715/863 |
| 2006/0026536 A1 | 2/2006 | Hotelling et al. | 715/863 |
| 2006/0033724 A1 | 2/2006 | Chaudhri et al. | 345/173 |
| 2006/0085757 A1 | 4/2006 | Andre et al. | 715/771 |
| 2006/0097991 A1 | 5/2006 | Hotelling et al. | 345/173 |
| 2006/0132460 A1 | 6/2006 | Kolmykov-Zotov et al. | 345/173 |
| 2006/0161870 A1 | 7/2006 | Hotelling et al. | 715/863 |
| 2006/0197753 A1 | 9/2006 | Hotelling | 345/173 |
| 2006/0274051 A1 | 12/2006 | Longe et al. | 345/173 |
| 2007/0152980 A1 | 7/2007 | Kocienda et al. | 345/173 |
| 2007/0198950 A1 | 8/2007 | Dodge et al. | |
| 2007/0257890 A1 | 11/2007 | Hotelling et al. | 345/173 |
| 2008/0140868 A1 | 6/2008 | Kalayjian et al. | 710/8 |
| 2008/0165142 A1 | 7/2008 | Kocienda et al. | 345/173 |
| 2008/0167834 A1 | 7/2008 | Herz et al. | 702/150 |
| 2008/0320391 A1 | 12/2008 | Lemay et al. | 715/702 |
| 2009/0119580 A1 * | 5/2009 | Rohrabaugh et al. | 715/249 |
| 2009/0225100 A1 | 9/2009 | Lee et al. | 345/660 |
| 2009/0228841 A1 | 9/2009 | Hildreth | 715/863 |
| 2009/0231485 A1 * | 9/2009 | Steinke | 348/425.1 |
| 2010/0083192 A1 * | 4/2010 | Zaman et al. | 715/866 |

FOREIGN PATENT DOCUMENTS

| | | |
|---|---|---|
| EP | 1918802 A1 | 5/2008 |
| GB | 2 351 639 A | 1/2001 |
| WO | WO 00/75766 A1 | 12/2000 |
| WO | WO 01/46790 A2 | 6/2001 |
| WO | WO 2004/051392 A2 | 6/2004 |
| WO | WO 2004/070604 A2 | 8/2004 |
| WO | 2006003591 A2 | 1/2006 |
| WO | WO 2006/020304 A2 | 2/2006 |
| WO | WO 2006/020305 A2 | 2/2006 |
| WO | 2008052100 A2 | 5/2008 |

OTHER PUBLICATIONS

Miller, D., "Personal/Java Application Environment," Jun. 8, 1999, 12 pages.

Rekimoto, J. et al., "PreSense: Interaction Techniques for Finger Sensing Input Devices," UIST 2003, Vancouver, BC, Canada, © 2003 ACM, vol. 5, Issue 2, pp. 203-212.

International Search Report and Written Opinion dated Jul. 18, 2008, received in International Application No. PCT/US2007/082486, which corresponds to U.S. Appl. No. 11/923,453.

Office Action dated Oct. 30, 2008, received in U.S. Appl. No. 11/553,436.

Office Action dated May 13, 2009, received in U.S. Appl. No. 11/553,436.

Office Action dated Oct. 30, 2009, received in U.S. Appl. No. 11/553,436.

* cited by examiner (A)

---

While continuing to detect the point of contact by the user on the touch-sensitive surface, detect a movement of the point of contact by the user on the touch-sensitive surface, and in response to detecting the movement, continuously change a respective displayed location of the loupe in accordance with the movement of the point of contact on the touch-sensitive surface. — 622

While continuing to detect the point of contact by the user on the touch-sensitive surface, display within the loupe a selection indicia in conjunction with at least one of the plurality of user interface elements displayed within the loupe, the selection indicia corresponding to a selected user interface element displayed on the display at a location corresponding to the point of contact on the touch-sensitive surface. — 624

Detect movement of the point of contact by the user on the touch-sensitive surface, and in response to detecting the movement, update the selection indicia to correspond to respective user interface elements in accordance with the movement of the point of contact when the point of contact on the touch-sensitive surface corresponds to respective locations of respective user interface elements displayed on the display. — 626

Detect an action gesture on the touch-sensitive surface, and perform an action associated with the activation gesture on the selected user interface element. — 628

Figure 6B

DEVICE, METHOD, AND GRAPHICAL USER INTERFACE FOR MANAGEMENT AND MANIPULATION OF USER INTERFACE ELEMENTS

TECHNICAL FIELD

The disclosed embodiments relate generally to computing devices, and more particularly, to computing devices and methods for managing and manipulating user interface content and small user interface elements.

BACKGROUND

The use of computers and other electronic computing devices for managing and manipulating user interface content and small user interface elements has increased significantly in recent years. Exemplary computing devices that include capabilities of managing user interface content and small user interface elements include mobile telephones, desktop computers, laptop computers, tablet computers, electronic book readers, consumer electronics, personal digital assistants, etc.

Many users rely on electronic computing devices for managing user interface content and user interface elements. Unfortunately, existing methods for managing and manipulating user interface content and small user interface elements are cumbersome and inefficient, particularly for manipulating small user interface elements. In addition, existing methods take longer than necessary, thereby wasting energy. This latter consideration is particularly important in battery-operated devices.

Accordingly, there is a need for computing devices with faster, more efficient methods and interfaces for methods for managing and manipulating user interface content and small user interface elements. Such methods and interfaces may complement or replace conventional methods for managing and manipulating user interface content and small user interface elements. Such methods and interfaces reduce the cognitive burden on a user and produce a more efficient human-machine interface. For battery-operated computing devices, such methods and interfaces conserve power and increase the time between battery charges.

SUMMARY

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital video recording, web browsing, digital music playing, and/or digital video playing. Executable instructions for performing these functions may be included in a computer readable storage medium or other computer program product configured for execution by one or more processors.

In accordance with some embodiments, a method is performed at a computing device with a display and a touch-sensitive surface. The method includes: displaying on the display a plurality of user interface elements; detecting a point of contact by a user on the touch-sensitive surface, wherein: the point of contact on the touch-sensitive surface corresponds to a location on the display of one or more of the plurality of user interface elements, and the one or more of the plurality of user interface elements have a feature size; while detecting the point of contact by the user on the touch-sensitive surface: determining whether the feature size of the one or more of the plurality of user interface elements exceeds a first predefined size threshold; when the feature size of the one or more of the plurality of user interface elements is greater than the first predefined size threshold, maintaining the display at a constant magnification; and when the feature size of the one or more of the plurality of user interface elements is less than the first predefined size threshold, displaying on the display a loupe that depicts a magnified image of at least one of the one or more of the plurality of user interface elements, wherein the magnified image corresponds to the area of the display corresponding to the location surrounding the point of contact on the touch-sensitive surface.

In accordance with some embodiments, a computing device includes a display, a touch-sensitive surface, one or more processors, memory, and one or more programs. The one or more programs are stored in the memory and configured to be executed by the one or more processors. The one or more programs include instructions for: displaying on the display a plurality of user interface elements; detecting a point of contact by a user on the touch-sensitive surface, wherein: the point of contact on the touch-sensitive surface corresponds to a location on the display of one or more of the plurality of user interface elements, and, the one or more of the plurality of user interface elements have a feature size; while detecting the point of contact by the user on the touch-sensitive surface: determining whether the feature size of the one or more of the plurality of user interface elements exceeds a first predefined size threshold; when the feature size of the one or more of the plurality of user interface elements is greater than the first predefined size threshold, maintaining the display at a constant magnification; and when the feature size of the one or more of the plurality of user interface elements is less than the first predefined size threshold, displaying on the display a loupe that depicts a magnified image of at least one of the one or more of the plurality of user interface elements, wherein the magnified image corresponds to the area of the display corresponding to the location surrounding the point of contact on the touch-sensitive surface.

In accordance with some embodiments there is a graphical user interface on a computing device with a display, a touch-sensitive surface, a memory, and one or more processors to execute one or more programs stored in the memory. The graphical user interface includes a plurality of user interface elements, wherein: a point of contact by a user is detected on the touch-sensitive surface, wherein the point of contact on the touch-sensitive surface corresponds to a location on the display of one or more of the plurality of user interface elements, and the one or more of the plurality of user interface elements have a feature size; while detecting the point of contact by the user on the touch-sensitive surface, and in response to detecting the point of contact: the feature size of the one or more of the plurality of user interface elements is compared with a first predefined size threshold to determine whether the feature size of the one or more of the plurality of user interface elements exceeds the first predefined size threshold; when the feature size of the one or more of the plurality of user interface elements is greater than the first predefined size threshold, the display is maintained at a constant magnification; and when the feature size of the one or more of the plurality of user interface elements is less than the first predefined size threshold, a loupe is displayed on the display, the loupe depicting a magnified image of at least one of the one or more of the plurality of user interface elements, wherein the magnified image corresponds to the area of the display corresponding to the location surrounding the point of contact on the touch-sensitive surface.

In accordance with some embodiments, a computer readable storage medium has stored therein one or more programs, the one or more programs comprising instructions, which when executed by a computing device with a display and a touch-sensitive surface, cause the computing device to: display a plurality of user interface elements; detect a point of contact by a user on the touch-sensitive surface, wherein: the point of contact on the touch-sensitive surface corresponds to a location on the display of one or more of the plurality of user interface elements, and the one or more of the plurality of user interface elements have a feature size; while detecting the point of contact by the user on the touch-sensitive surface: determine whether the feature size of the one or more of the plurality of user interface elements exceeds a first predefined size threshold; when the feature size of the one or more of the plurality of user interface elements is greater than the first predefined size threshold, maintain the display at a constant magnification; and when the feature size of the one or more of the plurality of user interface elements is less than the first predefined size threshold, display on the display a loupe that depicts a magnified image of at least one of the one or more of the plurality of user interface elements, wherein the magnified image corresponds to the area of the display corresponding to the location surrounding the point of contact on the touch-sensitive surface.

In accordance with some embodiments, a computing device includes a display, a touch-sensitive surface, and means for displaying a plurality of user interface elements; means for detecting a point of contact by a user on the touch-sensitive surface, wherein: the point of contact on the touch-sensitive surface corresponds to a location on the display of one or more of the plurality of user interface elements, and the one or more of the plurality of user interface elements have a feature size; while detecting the point of contact by the user on the touch-sensitive surface: means for determining whether the feature size of the one or more of the plurality of user interface elements exceeds a first predefined size threshold; when the feature size of the one or more of the plurality of user interface elements is greater than the first predefined size threshold, means for maintaining the display at a constant magnification; and when the feature size of the one or more of the plurality of user interface elements is less than the first predefined size threshold, means for displaying on the display a loupe that depicts a magnified image of at least one of the one or more of the plurality of user interface elements, wherein the magnified image corresponds to the area of the display corresponding to the location surrounding the point of contact on the touch-sensitive surface.

In accordance with some embodiments, an information processing apparatus for use in a computing device includes a display, a touch-sensitive surface, and means for displaying a plurality of user interface elements; means for detecting a point of contact by a user on the touch-sensitive surface, wherein: the point of contact on the touch-sensitive surface corresponds to a location on the display of one or more of the plurality of user interface elements, and the one or more of the plurality of user interface elements have a feature size; while detecting the point of contact by the user on the touch-sensitive surface: means for determining whether the feature size of the one or more of the plurality of user interface elements exceeds a first predefined size threshold; when the feature size of the one or more of the plurality of user interface elements is greater than the first predefined size threshold, means for maintaining the display at a constant magnification; and when the feature size of the one or more of the plurality of user interface elements is less than the first predefined size threshold, means for displaying on the display a loupe that depicts a magnified image of at least one of the one or more of the plurality of user interface elements, wherein the magnified image corresponds to the area of the display corresponding to the location surrounding the point of contact on the touch-sensitive surface.

In accordance with some embodiments, a method is performed at a computing device with a display and a touch-sensitive surface. The method includes displaying a plurality of user interface elements; detecting a point of contact by a user on the touch-sensitive surface, wherein: the point of contact on the touch-sensitive surface corresponds to a location on the display of one or more of the plurality of user interface elements, and a smallest displayed feature size is associated with at least one of the plurality of user interface elements on the location of the display corresponding to the point of contact on the touch-sensitive surface; while detecting the point of contact by the user on the touch-sensitive surface: determining whether the smallest displayed feature size exceeds a first predefined size threshold; when the smallest displayed feature size is less than the first predefined size threshold: scaling a magnification factor in accordance with the feature size of the one or more of the plurality of user interface elements; and displaying on the display a loupe that depicts a magnified image of at least one of the one or more of the plurality of user interface elements, wherein the magnified image is displayed in accordance with the scaled magnification factor.

In accordance with some embodiments, a computing device includes a display, a touch-sensitive surface, one or more processors, memory, and one or more programs. The one or more programs are stored in the memory and configured to be executed by the one or more processors. The one or more programs include instructions for: displaying a plurality of user interface elements; detecting a point of contact by a user on the touch-sensitive surface, wherein: the point of contact on the touch-sensitive surface corresponds to a location on the display of one or more of the plurality of user interface elements, and a smallest displayed feature size is associated with at least one of the plurality of user interface elements on the location of the display corresponding to the point of contact on the touch-sensitive surface; while detecting the point of contact by the user on the touch-sensitive surface: determining whether the smallest displayed feature size exceeds a first predefined size threshold; when the smallest displayed feature size is less than the first predefined size threshold: scaling a magnification factor in accordance with the feature size of the one or more of the plurality of user interface elements; and displaying on the display a loupe that depicts a magnified image of at least one of the one or more of the plurality of user interface elements, wherein the magnified image is displayed in accordance with the scaled magnification factor.

In accordance with some embodiments there is a graphical user interface on a computing device with a display, a touch-sensitive surface, a memory, and one or more processors to execute one or more programs stored in the memory. The graphical user interface includes a plurality of user interface elements, wherein: a point of contact by a user is detected on the touch-sensitive surface, wherein: the point of contact on the touch-sensitive surface corresponds to a location on the display of one or more of the plurality of user interface elements, and a smallest displayed feature size is associated with at least one of the plurality of user interface elements on the location of the display corresponding to the point of contact on the touch-sensitive surface; while detecting the point of contact by the user on the touch-sensitive surface, and in response to detecting the point of contact: the smallest displayed feature size is compared with a first predefined size threshold to determine whether the smallest displayed feature size exceeds the first predefined size threshold; when the smallest displayed feature size is less than the first predefined size threshold: a magnification factor is scaled in accordance with the feature size of the one or more of the plurality of user interface elements; and a loupe is displayed on the display, the loupe depicting a magnified image of at least one of the one or more of the plurality of user interface elements, wherein the magnified image is displayed in accordance with the scaled magnification factor.

In accordance with some embodiments, a computer readable storage medium has stored therein one or more programs, the one or more programs comprising instructions, which when executed by a computing device with a display and a touch-sensitive surface, cause the computing device to: display a plurality of user interface elements; detect a point of contact by a user on the touch-sensitive surface, wherein: the point of contact on the touch-sensitive surface corresponds to a location on the display of one or more of the plurality of user interface elements, and a smallest displayed feature size is associated with at least one of the plurality of user interface elements on the location of the display corresponding to the point of contact on the touch-sensitive surface; while detecting the point of contact by the user on the touch-sensitive surface: determine whether the smallest displayed feature size exceeds a first predefined size threshold; when the smallest displayed feature size is less than the first predefined size threshold: scale a magnification factor in accordance with the feature size of the one or more of the plurality of user interface elements; and display on the display a loupe that depicts a magnified image of at least one of the one or more of the plurality of user interface elements, wherein the magnified image is displayed in accordance with the scaled magnification factor.

In accordance with some embodiments, a computing device includes a display; a touch-sensitive surface; and means for displaying a plurality of user interface elements; means for detecting a point of contact by a user on the touch-sensitive surface, wherein: the point of contact on the touch-sensitive surface corresponds to a location on the display of one or more of the plurality of user interface elements, and a smallest displayed feature size is associated with at least one of the plurality of user interface elements on the location of the display corresponding to the point of contact on the touch-sensitive surface; while detecting the point of contact by the user on the touch-sensitive surface: means for determining whether the smallest displayed feature size exceeds a first predefined size threshold; when the smallest displayed feature size is less than the first predefined size threshold: means for scaling a magnification factor in accordance with the feature size of the one or more of the plurality of user interface elements; and means for displaying on the display a loupe that depicts a magnified image of at least one of the one or more of the plurality of user interface elements, wherein the magnified image is displayed in accordance with the scaled magnification factor.

In accordance with some embodiments, an information processing apparatus for use in a computing device includes a display, a touch-sensitive surface, and means for displaying a plurality of user interface elements; means for detecting a point of contact by a user on the touch-sensitive surface, wherein: the point of contact on the touch-sensitive surface corresponds to a location on the display of one or more of the plurality of user interface elements, and a smallest displayed feature size is associated with at least one of the plurality of user interface elements on the location of the display corresponding to the point of contact on the touch-sensitive surface; while detecting the point of contact by the user on the touch-sensitive surface: means for determining whether the smallest displayed feature size exceeds a first predefined size threshold; when the smallest displayed feature size is less than the first predefined size threshold: means for scaling a magnification factor in accordance with the feature size of the one or more of the plurality of user interface elements; and means for displaying on the display a loupe that depicts a magnified image of at least one of the one or more of the plurality of user interface elements, wherein the magnified image is displayed in accordance with the scaled magnification factor.

Thus, the computing devices disclosed herein are provided with faster, more efficient methods and interfaces for managing and manipulating user interface content and small user interface elements. These computing devices with faster, more efficient methods and interfaces increase user effectiveness, efficiency, and satisfaction. Such methods and interfaces may complement or replace conventional methods for managing and manipulating user interface content and small user interface elements.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 6A-6C are flow diagrams illustrating methods of managing and manipulating user interface content and small user interface elements in accordance with some embodiments.

DESCRIPTION OF EMBODIMENTS

Figure 1A:
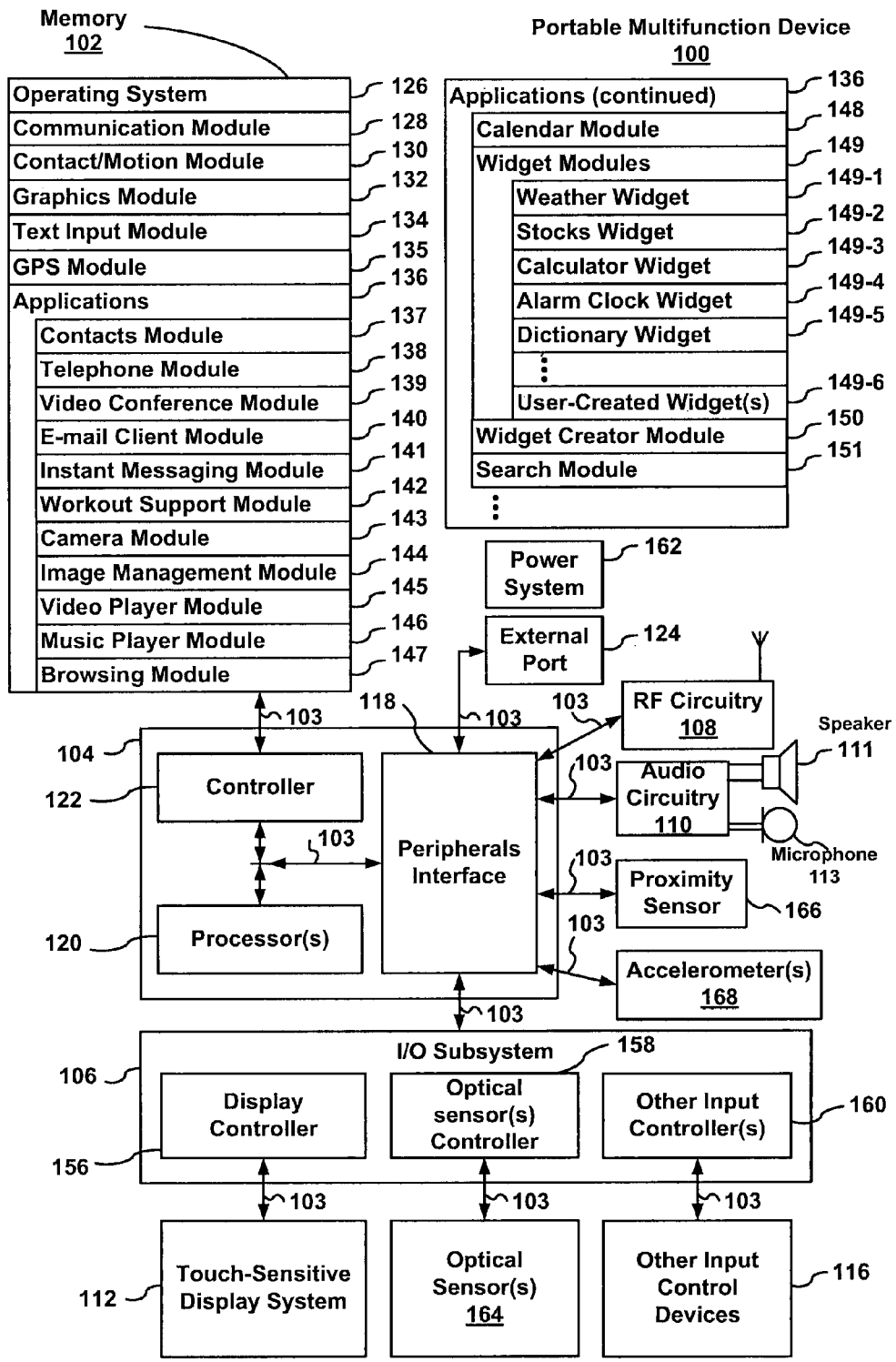
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple, Inc. of Cupertino, Calif. Other portable devices such as laptops or tablet computers with touch-sensitive surfaces (e.g., touch screen displays and/or touch pads) may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
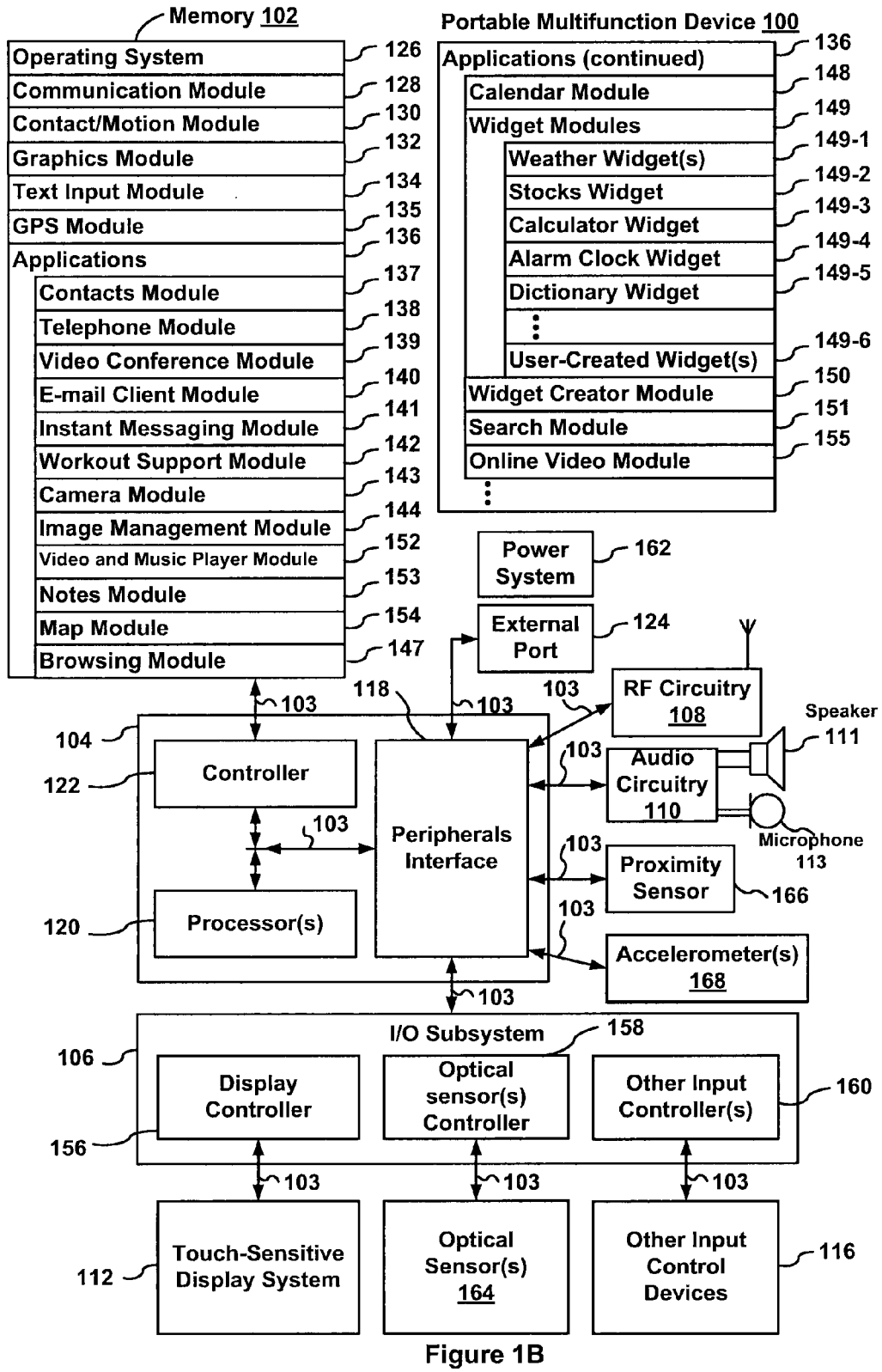

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components.

The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple, Inc. of Cupertino, Calif.

A touch-sensitive display in some embodiments of the touch screen 112 may be analogous to the multi-touch sensitive touchpads described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, a touch screen 112 displays visual output from the portable device 100, whereas touch sensitive touchpads do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include a charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call).

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 2005/

0190059, "Acceleration-based Theft Detection System for Portable Electronic Devices," and U.S. Patent Publication No. 2006/0017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up event.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a workout support module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968, 067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
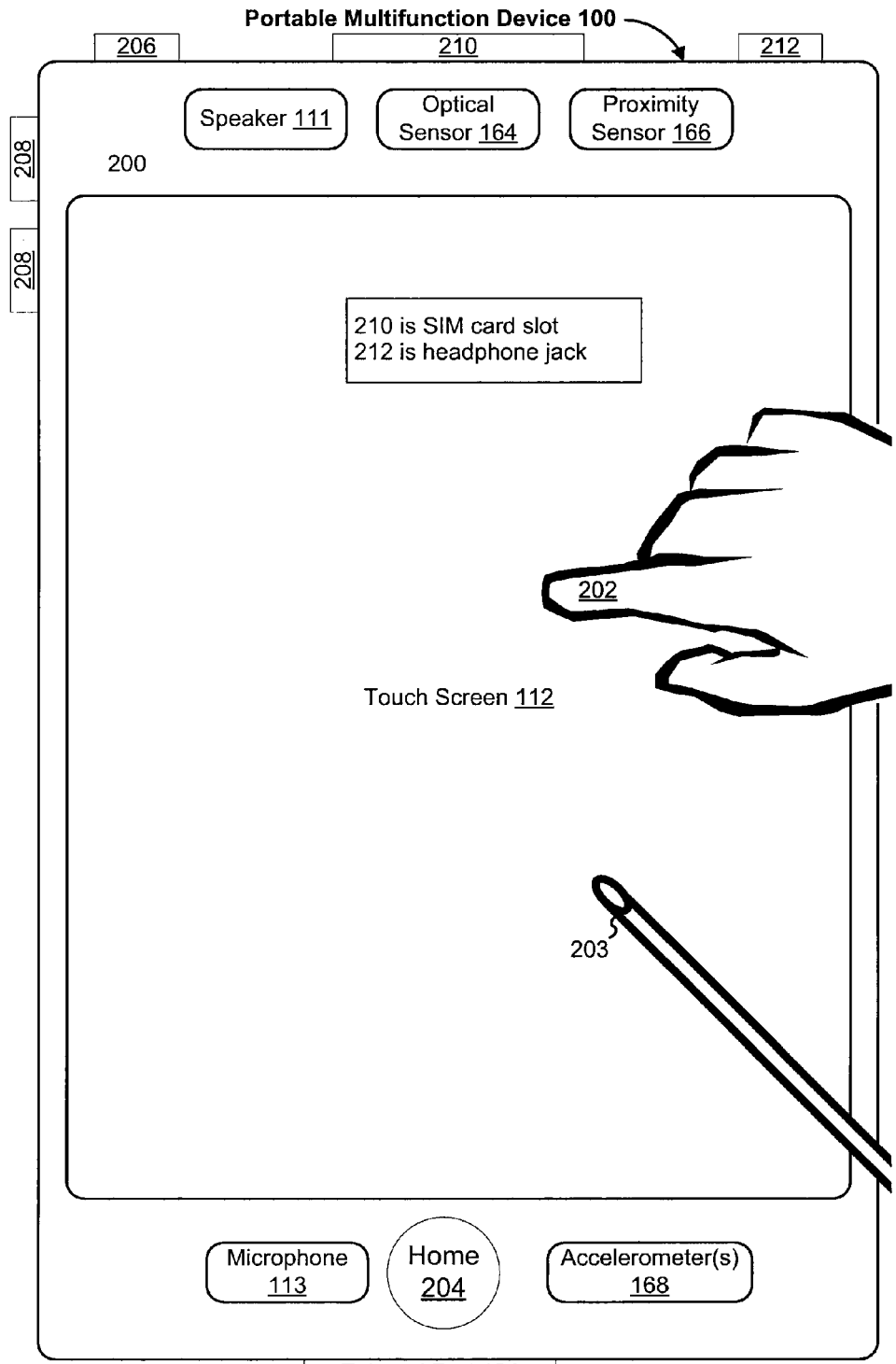
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100 (e.g., applications depicted in FIGS. 1A, 1B and 3). Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
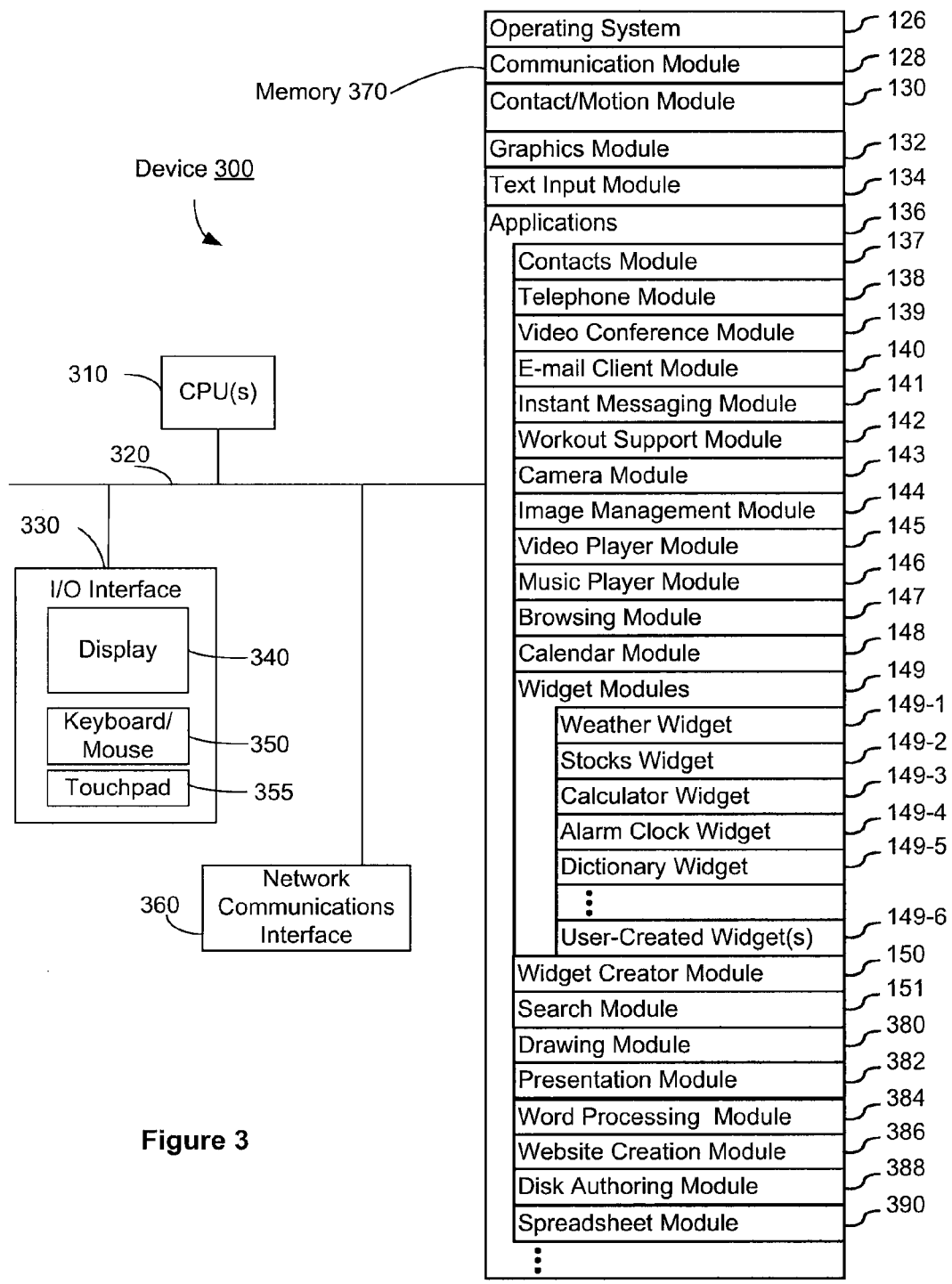
FIG. 3 is a block diagram of an exemplary multifunction device with a display and a touch-sensitive surface in accordance with some embodiments.

FIG. 3 is a block diagram of an exemplary multifunction device with a display and a touch-sensitive surface in accordance with some embodiments. Device 300 need not be portable. In some embodiments, the device 300 is a laptop computer, a desktop computer, a tablet computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes a user interface 330 comprising a display 340, which is typically a touch screen display. The user interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
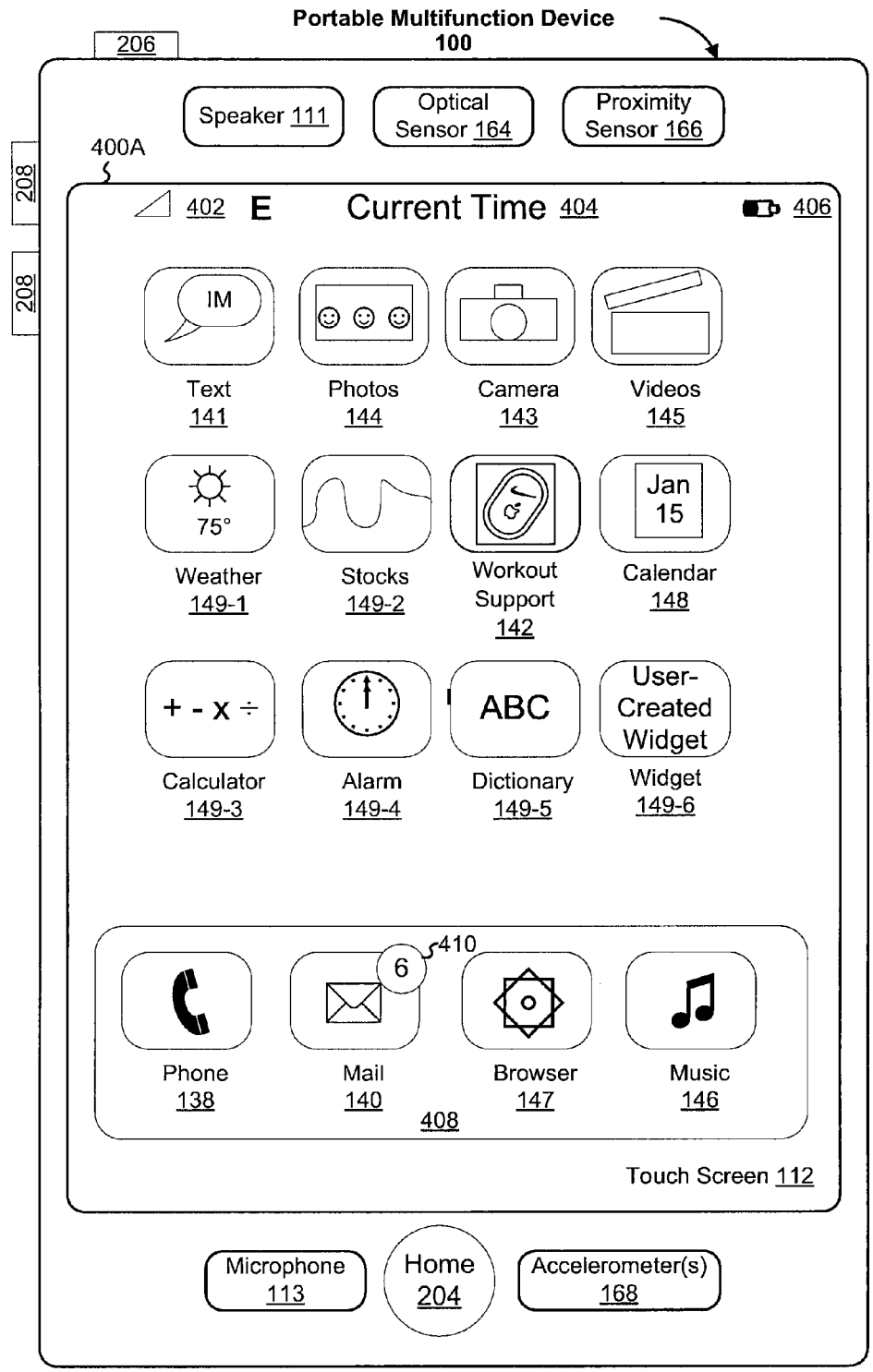
FIGS. 4A and 4B illustrate exemplary user interfaces for a menu of applications on a portable multifunction device in accordance with some embodiments.
Figure 4B:
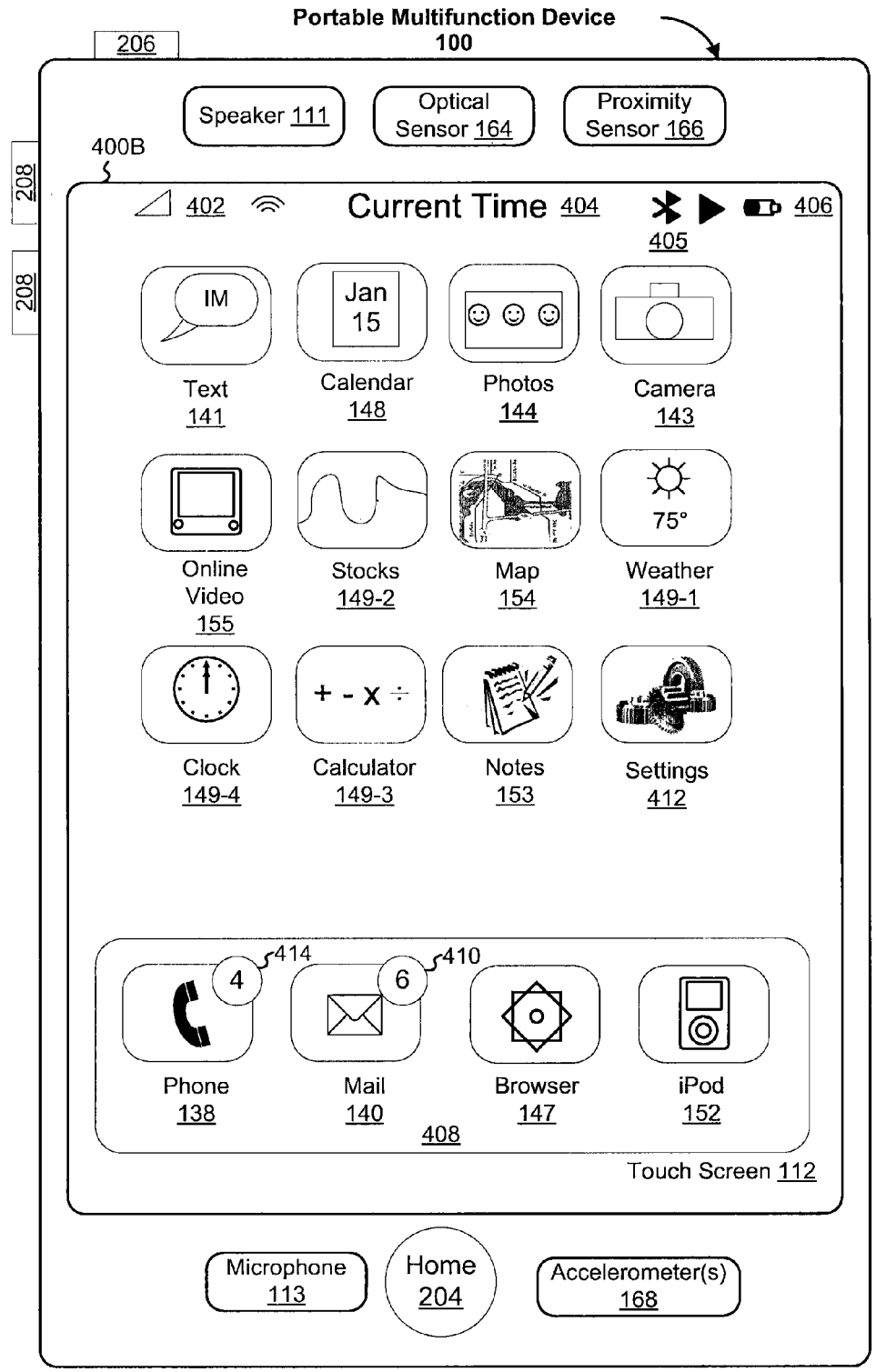

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
  402, 404, 405, 406, 141, 148, 144, 143, 149-3, 149-2, 149-1, 149-4, 410, 414, 138, 140, and 147, as described above;
  Map 154;
  Notes 153;
  Settings 412, which provides access to settings for the device 100 and its various applications 136, as described further below;
  Video and music player module 152, also referred to as iPod (trademark of Apple, Inc.) module 152; and
  Online video module 155, also referred to as YouTube (trademark of Google, Inc.) module 155.

Figure 4C:
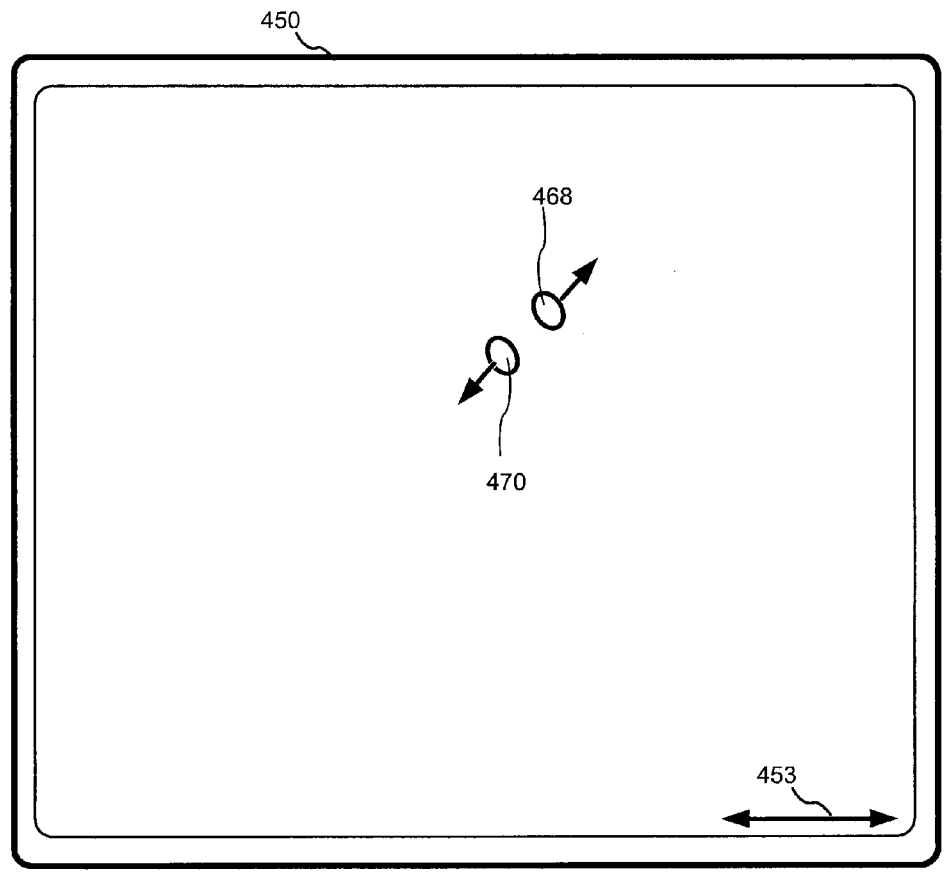
FIG. 4C illustrates an exemplary user interface for a multifunction device with a touch-sensitive surface that is separate from the display in accordance with some embodiments.
Figure 4C:
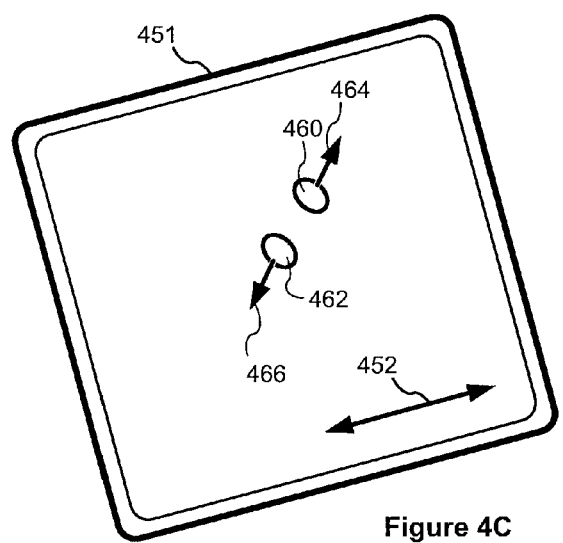

FIG. 4C illustrates an exemplary user interface on a multifunction device with a separate display (e.g., 450) and touch-sensitive surface (e.g., 451). Although many of the examples which follow will be given with reference to a touch screen display (e.g., where the touch sensitive surface and the display are combined, as shown in device 100 in FIGS. 4A-4B), in some embodiments the display and the touch-sensitive surface are separate, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462) detected by the device on the touch-sensitive surface (e.g., 451 in FIG. 4C) are used by the device to manipulate the user interface on the display (e.g., 450 in FIG. 4C) of the multifunction device when the touch-sensitive surface and the display are separate. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300 or portable multifunction device 100.

FIGS. 5A-5L illustrate exemplary user interfaces for managing and manipulating user interface content and small user interface elements in accordance with some embodiments. The user interfaces in these figures are used to illustrate the processes described below, including the processes in FIGS. 6A-6C.

UI 500A (FIG. 5A) depicts an exemplary user interface displayed on device 100. In this example, the user interface includes an electronic document 500 having a plurality of user interface elements, including bar chart elements 501, 502, and 503. Near a corner of bar chart element 503, a user has made, and the device has detected, a single finger contact 505 on the touch screen 112. Single finger contact 505 corresponds to a location on the display of one or more of the plurality of user interface elements, specifically in this example, bar chart element 503.

In this example, bar chart elements 501, 502, and 503 have the same horizontal-feature size in electronic document 500, e.g., bar chart element 503 is width 507, which is greater than predefined size threshold 509 (displayed in UI 500A for purposes of illustration).

UI 500B (FIG. 5B) illustrates that while detecting single finger contact 505 on the touch screen 112, the display of electronic document 500 is kept at a constant magnification, since, as illustrated in UI 500A, bar chart element 503 is width 507, which is greater than predefined size threshold 509.

Further, selection indicia 503s is displayed in conjunction with at least one of the plurality of user interface elements, i.e., selection indicia 503s highlights bar chart element 503 that was selected by single finger contact 505.

UI 500C (FIG. 5C) illustrates an exemplary user interface displayed on device 100. In this example, the user interface includes electronic document 510 having a plurality of user interface elements, including bar chart elements 512, 513, 514, 515, and 516. Near a corner of bar chart element 514, a user has made, and the device has detected, a single finger contact 511 on the touch screen 112. Single finger contact 511 corresponds to a location on the display of one or more of the plurality of user interface elements, specifically in this example, bar chart elements 513, 514, 515, and 516.

In this example, all bar chart elements in electronic document 510, including bar chart elements 512, 513, 514, 515, and 516, have the same horizontal-feature size, e.g., bar chart element 512 is width 518, which is less than predefined size threshold 509 (displayed in UI 500C for purposes of illustration). Accordingly, bar chart elements 513, 514, 515, and 516 are less than predefined size threshold 509.

UI 500D (FIG. 5D) illustrates that while detecting single finger contact 511 on the touch screen 112, loupe 520 is displayed, depicting a magnified image of at least one of the one or more of the plurality of user interface elements, since, as illustrated in UT 500C, bar chart elements 513, 514, 515, and 516 are width 518, which is less than predefined size threshold 509. Specifically, loupe 520 is displaying a magnified image of bar chart elements 513, 514, 515, and 516, as magnified bar chart elements 513m, 514m, 515m, and 516m.

The magnified image in loupe 520 corresponds to the area of the display corresponding to the location surrounding single finger contact 511 on the touch screen 112.

The difference in behavior between UI 500A-UI 500B and UI 500C-UI 500D is based on whether the feature size of user interface elements exceeds a predefined size threshold. In the exemplary user interfaces of UI 500A-UI 500B, the display of electronic document 510 was kept at a constant magnification since the width 507 of bar chart element 503 was greater than predefined size threshold 509. In UI 500C-UI 500D, however, the bar chart elements proximate to single finger contact 511, i.e., bar chart elements 513, 514, 515, and 516, are less than predefined size threshold 509. Therefore, loupe 520 is displayed to assist a user in managing and manipulating small user interface elements.

Further, in UI 500D, a selection indicia 514s is displayed in conjunction with at least one of the plurality of user interface elements, i.e., selection indicia 514s highlights bar chart element 514m, where single finger contact 511 has selected bar chart element 514.

UI 500D also depicts movement 522 of single finger contact 511 on touch screen 112.

UI 500E (FIG. 5E) depicts continued movement 522 on touch screen 112 of single finger contact 511. Loupe 520 has moved to the right in accordance with movement 522 of single finger contact 511. Additionally, in accordance with the movement 522 of single finger contact 511, the selection indicia 515s now highlights bar chart element 515m; selection indicia 515 has been updated from 514s as depicted in UI 500D to 515s in UI 500E to highlight bar chart element 515, which is currently selected by single finger contact 511.

UI 500F (FIG. 5F) depicts that in accordance with the movement 522 of single finger contact 511 depicted in UT 500E, the selection indicia 516s now highlights bar chart element 516m, where single finger contact 511 has selected bar chart element 516.

UI 500F also illustrates an exemplary first portion of action gesture 524, which in this example, is pressing the home button 204. While any suitable gesture may be used as an action gesture, alternate embodiments may use gestures such as: detecting an increase in size of the point of contact when a user presses harder with the point of contact on the touch-sensitive surface; bimanual gestures, such as detecting a second point of contact at a different location while continuing to detect the single finger contact 511, shaking the device 100 while maintaining the single finger contact 511, etc.

UT 500G (FIG. 5G) illustrates that in response to detecting first portion of action gesture 524, action menu 526 is displayed, which includes options edit, cut, copy, and paste, 526-1, 526-2, 526-3, and 526-4, respectively.

In some embodiments, after the initiation of an action gesture is detected when a loupe is displayed in response to detecting a single point of contact by a user on the touch-sensitive surface, display of the loupe is maintained when the point of contact is lifted off. This frees the user to perform actions in other parts of the user interface, e.g., pressing soft buttons or physical buttons with the same finger that formed the single point of contact (or a different finger or fingers), moving or resizing user interface elements, etc.

UI 500H (FIG. 5H) illustrates second point of contact 528 over action menu option cut 526-2. In this example, detecting second point of contact 528 over action menu option cut 526-2 is a second portion of action gesture 524. Note that selection indicia 516s indicates that bar code element 516 is selected.

Though not depicted explicitly, second point of contact 528 is lifted off of touch screen 112 in UI 500H, ending action gesture 524.

UI 500I (FIG. 5I) illustrates that in response to action gesture 524, bar code element 516 was cut from the user interface.

UI 500J (FIG. 5J) illustrates that, in this exemplary embodiment, in response to detecting liftoff of single finger contact 528, display of the loupe 520 is terminated.

In some embodiments, terminating the loupe display is delayed for a predefined duration after detecting liftoff of a point of contact, e.g., 2 seconds, 3 seconds, etc., or any suitable period of time, so that the user can observe the area around the point of contact in a magnified form.

In some embodiments, terminating the loupe display is delayed for a predefined duration after detecting completion of an action gesture, e.g., 2 seconds, 3 seconds, etc., or any suitable period of time, so that the user can observe the effect of the action gesture.

UI 500K-UI 500L (FIGS. 5K-5L) illustrate exemplary electronic documents with first graph 542 and second graph 544, respectively. First graph 542 has user interface elements that are bar chart elements, such as bar chart element 542-1. Second graph 544 also has user interface elements that are bar chart elements, such as bar chart element 544-1.

Note that the bar chart elements in first graph 542, e.g., 542-1, have a smaller feature size than the bar chart elements in second graph 544, e.g., 544-1.

Points of contact 546 and 548 are detected within first graph 542 and second graph 544, respectively, and in response, loupes 550 and 552 are displayed at respective locations offset from points of contact 546 and 548.

Loupes 550 and 552 use magnification factors that are scaled in accordance with the feature size of the user interface elements being magnified. Specifically, loupe 550 uses a magnification factor that is scaled higher than the magnification factor loupe 552 uses. This difference in magnification factor scaling accounts for the fact that the bar chart elements in first graph 542 have a smaller feature size than the bar chart elements in second graph 544. Accordingly, magnification loupes which automatically scale the magnification factor to account for user interface element sizes are presented.

Figure 6A:
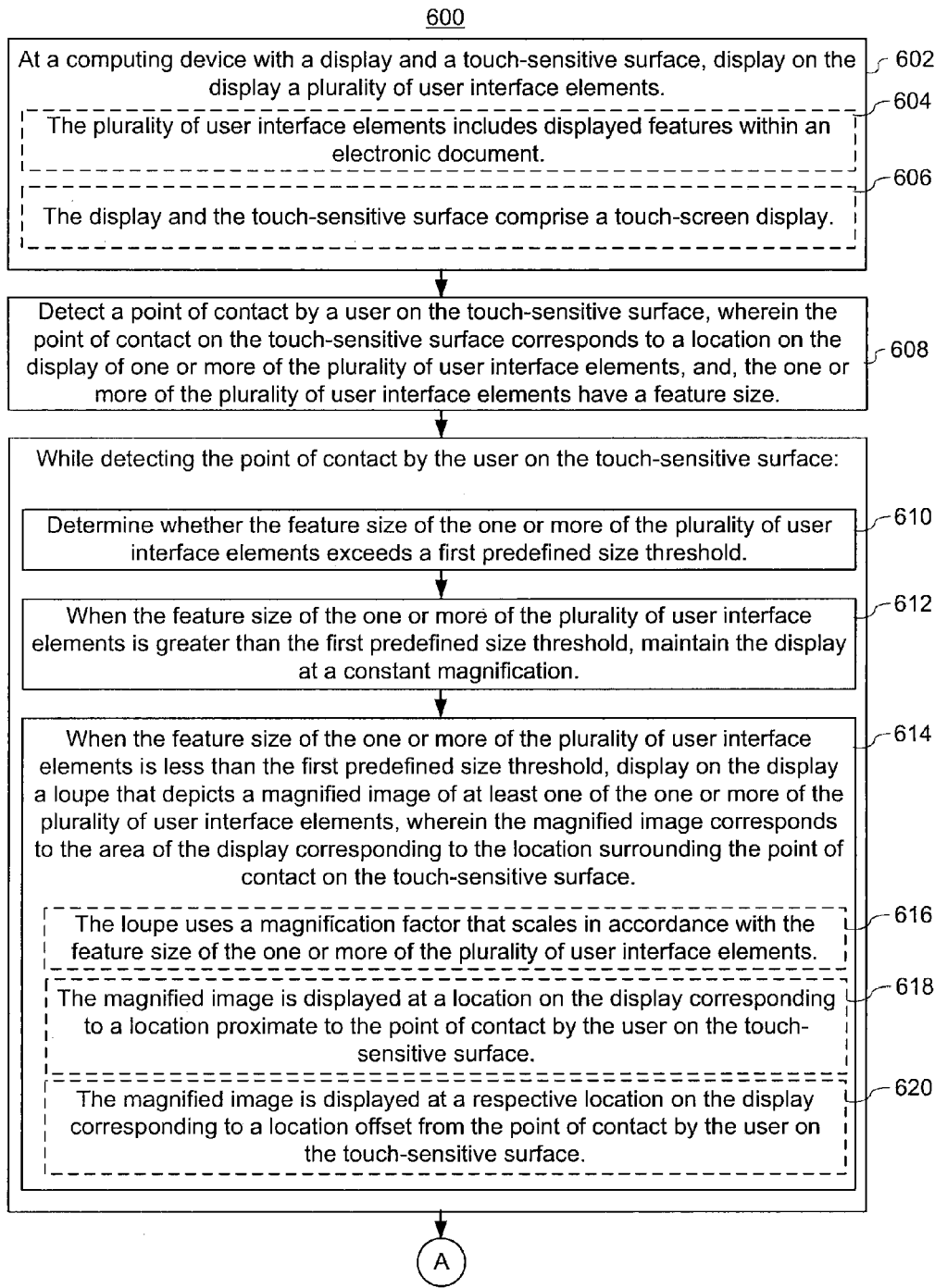

FIGS. 6A-6B are flow diagrams illustrating a method 600 of managing and manipulating user interface content and small user interface elements in accordance with some embodiments. The method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to manage and manipulate user interface content and small user interface elements. The method reduces the cognitive burden on a user when managing and manipulating user interface content and small user interface elements, thereby creating a more efficient human-machine interface. For battery-operated computing devices, enabling a user to manage and manipulate user interface content and small user interface elements faster and more efficiently conserves power and increases the time between battery charges.

Figure 5A:
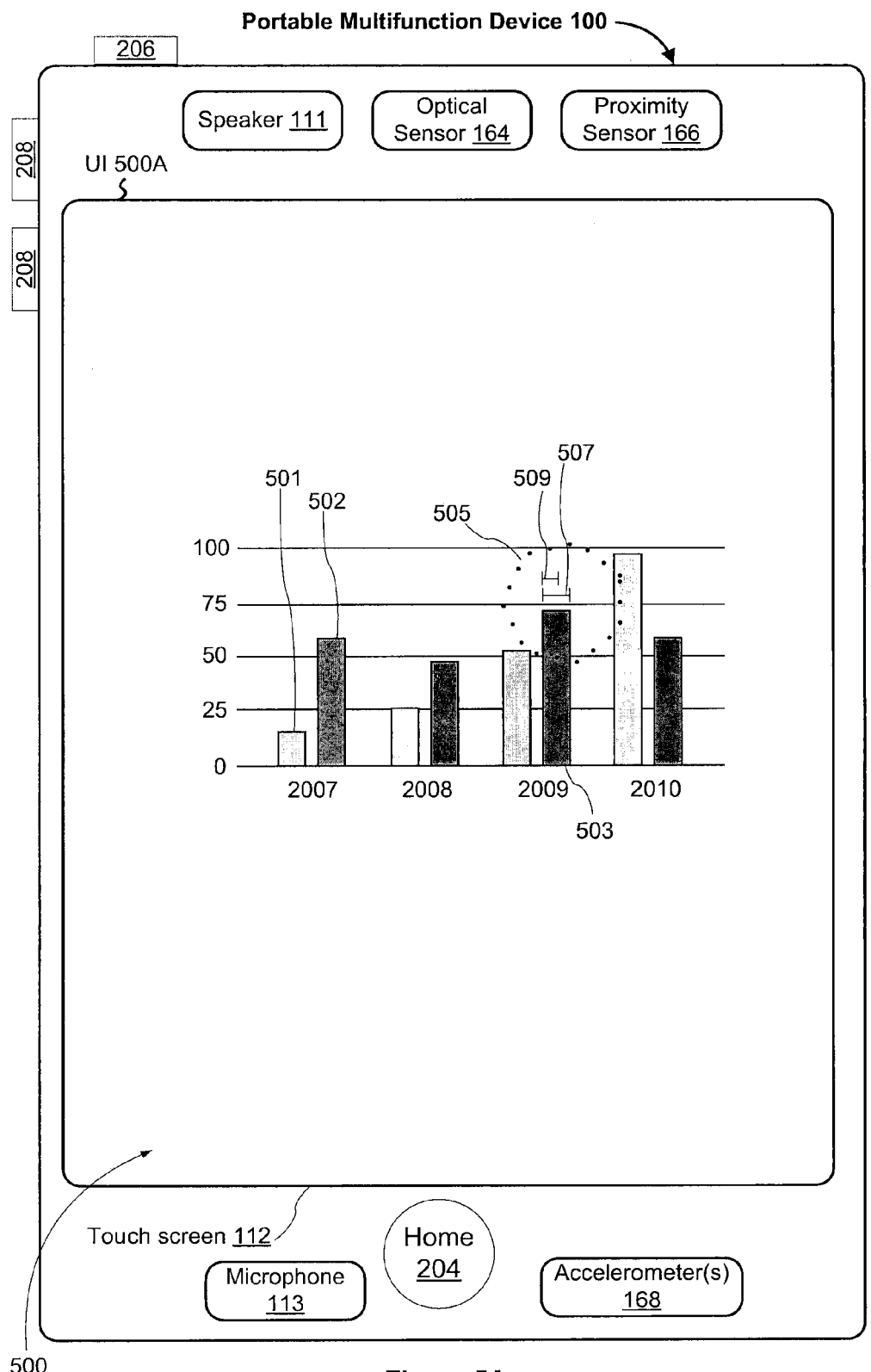
FIGS. 5A-5L illustrate exemplary user interfaces for managing and manipulating user interface content and small user interface elements in accordance with some embodiments.

The method 600 is performed at a computing device with a display and one or more user input devices adapted to detect user gestures (e.g., FIG. 5A portable multifunction device 100, FIG. 3 device 300). The device displays on the display a plurality of user interface elements (602) (e.g., FIG. 5A, electronic document 500 having a plurality of user interface elements, including bar chart elements 501, 502, and 503). Many user interface element types may be managed and manipulated with method 600, including without limitation, graph elements, icons, list elements, thumbnails, blocks of text, graphics on electronic canvases, files within file system browsers, spreadsheet cells, displayed map user interface elements and content, including higher levels of zoom magnification, identification of points of interest, user navigation tools such as routing pins for start points, waypoints, and destinations, etc.

In some embodiments, the plurality of user interface elements includes displayed features within an electronic document (604) (e.g., FIG. 5A, electronic document 500 having a plurality of user interface elements, including bar chart elements 501, 502, and 503).

In some embodiments, the display and the touch-sensitive surface comprise a touch-screen display (606) (e.g., FIG. 5A touch screen 112).

The device detects a point of contact by a user on the touch-sensitive surface, wherein the point of contact on the touch-sensitive surface corresponds to a location on the display of one or more of the plurality of user interface elements, and, the one or more of the plurality of user interface elements have a feature size (608) (e.g., FIG. 5A, single finger contact 505 corresponds to a location on the display of one or more of the plurality of user interface elements, i.e., bar chart element 503; bar chart elements 501, 502, and 503 have a horizontal-feature size in electronic document 500, i.e., bar chart element 503 is width 507).

While detecting the point of contact by the user on the touch-sensitive surface, the device determines whether the feature size of the one or more of the plurality of user interface elements exceeds a first predefined size threshold (610) (e.g., FIG. 5A, bar chart element 503 is width 507, and is compared to predefined size threshold 509; FIG. 5C, bar chart element 512 is width 518, and is compared to predefined size threshold 509). Predefined size threshold can be any suitable value based on the screen resolution and the sensitivity of the touch-sensitive surface, e.g., a predefined size threshold may be defined in distance measurements such as ⅛ inch, ¼ inch, ⅜ inch, ½ inch (or fractions of centimeters), or any suitable distance; a predefined size threshold may also be defined in relation to the display in pixels, such as 7 pixels, 10 pixels, 12 pixels, 14 pixels, or any suitable value.

Figure 5B:
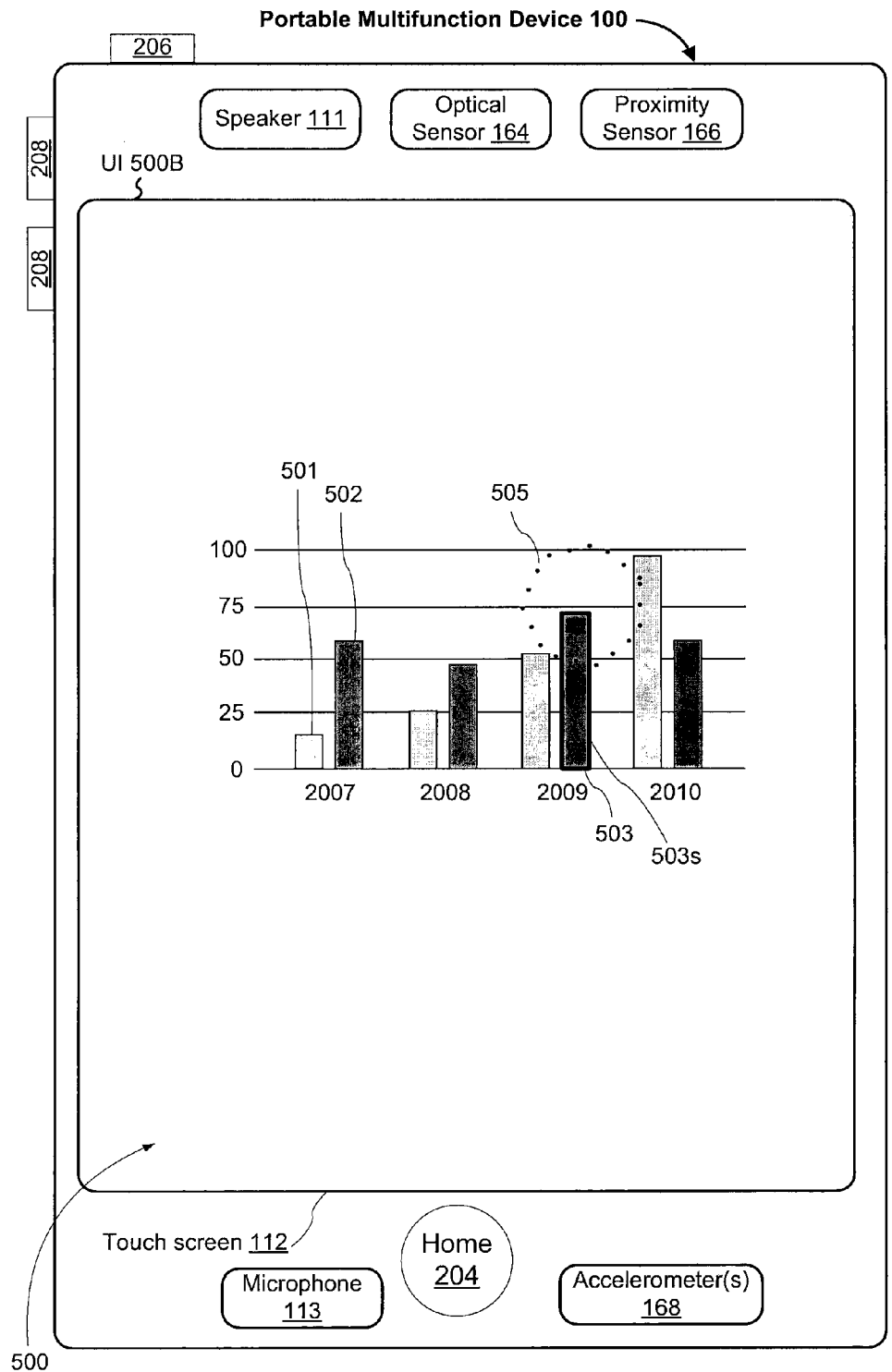
Figure 5C:
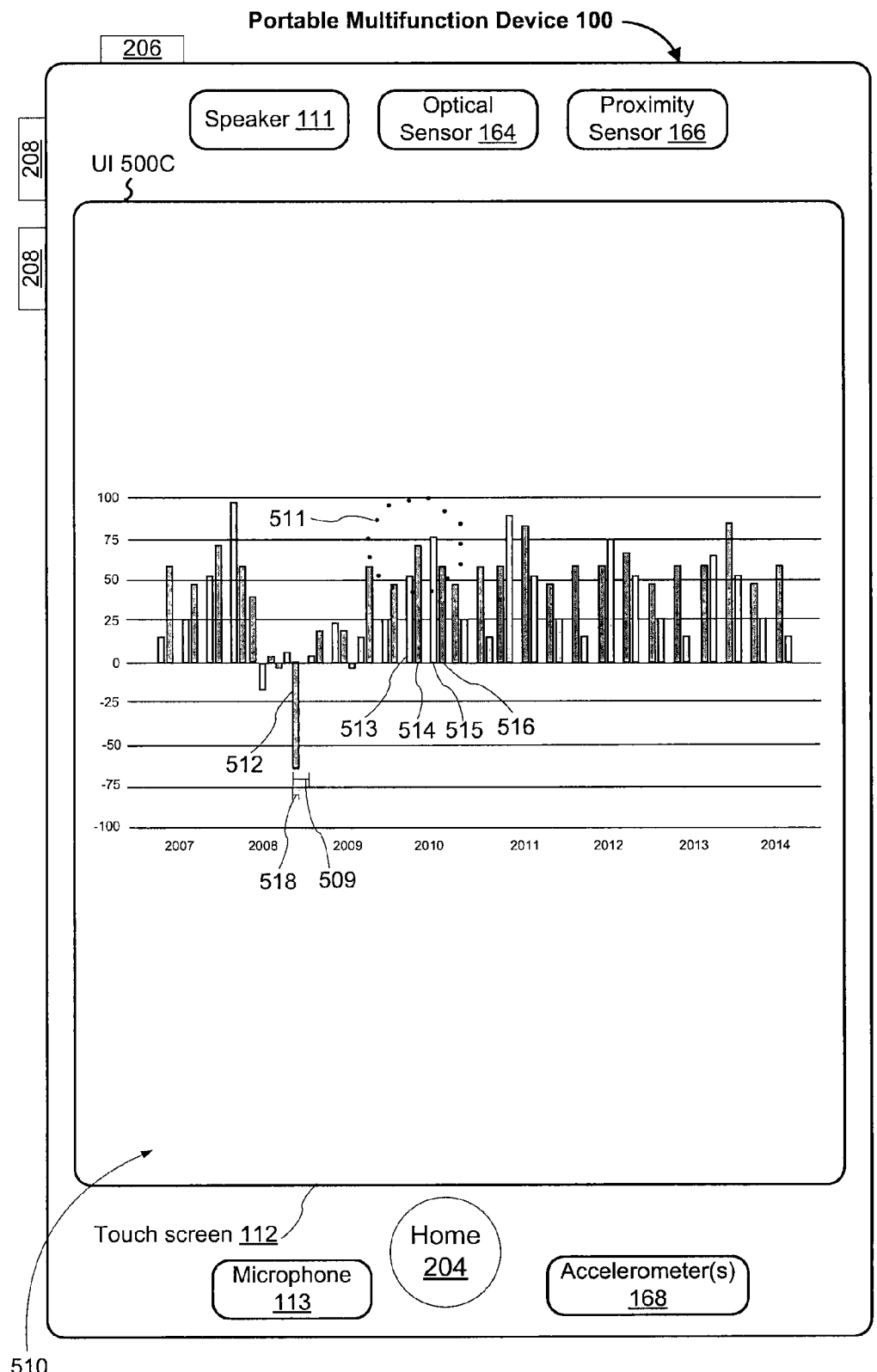

While continuing to detect the point of contact by the user on the touch-sensitive surface, and when the feature size of the one or more of the plurality of user interface elements is greater than or equal to the first predefined size threshold, the device maintains the display at a constant magnification (612) (e.g., FIG. 5B, display of electronic document 500 is kept at a constant magnification, since, as illustrated in FIG. 5A, bar chart element 503 is width 507, which is greater than predefined size threshold 509).

Figure 5D:
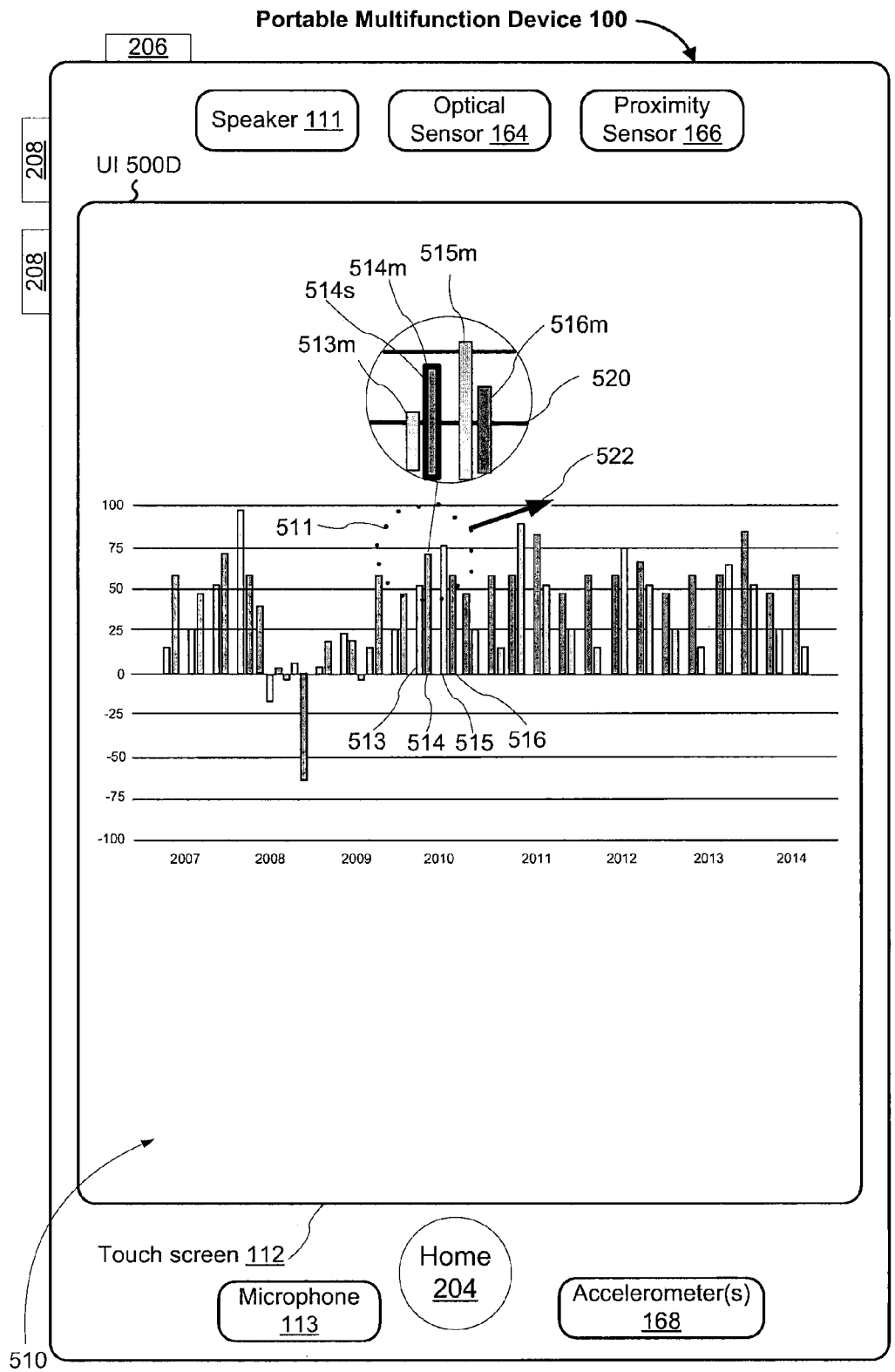

While continuing to detect the point of contact by the user on the touch-sensitive surface, and when the feature size of the one or more of the plurality of user interface elements is less than the first predefined size threshold, the device displays on the display a loupe that depicts a magnified image of at least one of the one or more of the plurality of user interface elements, wherein the magnified image corresponds to the area of the display corresponding to the location surrounding the point of contact on the touch-sensitive surface (614) (e.g., FIG. 5D, displayed loupe 520 depicts a magnified image of at least one of the one or more of the plurality of user interface elements, since, as illustrated in FIG. 5C, bar chart elements 513, 514, 515, and 516 are width 518, which is less than predefined size threshold 509, and the magnified image in loupe 520 corresponds to the area of the display corresponding to the location surrounding single finger contact 511 on the touch screen 112).

Figure 5E:
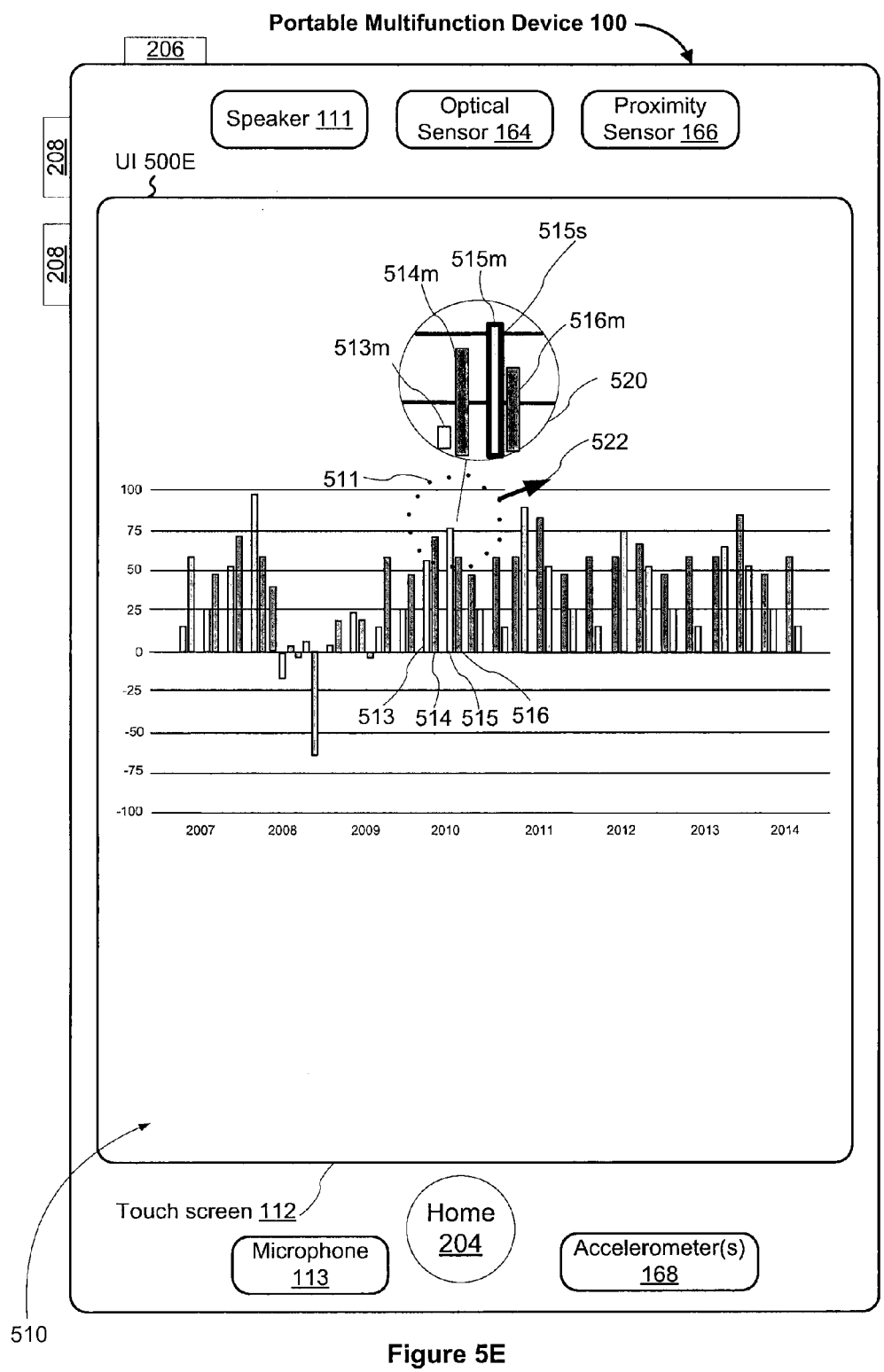
Figure 5F:
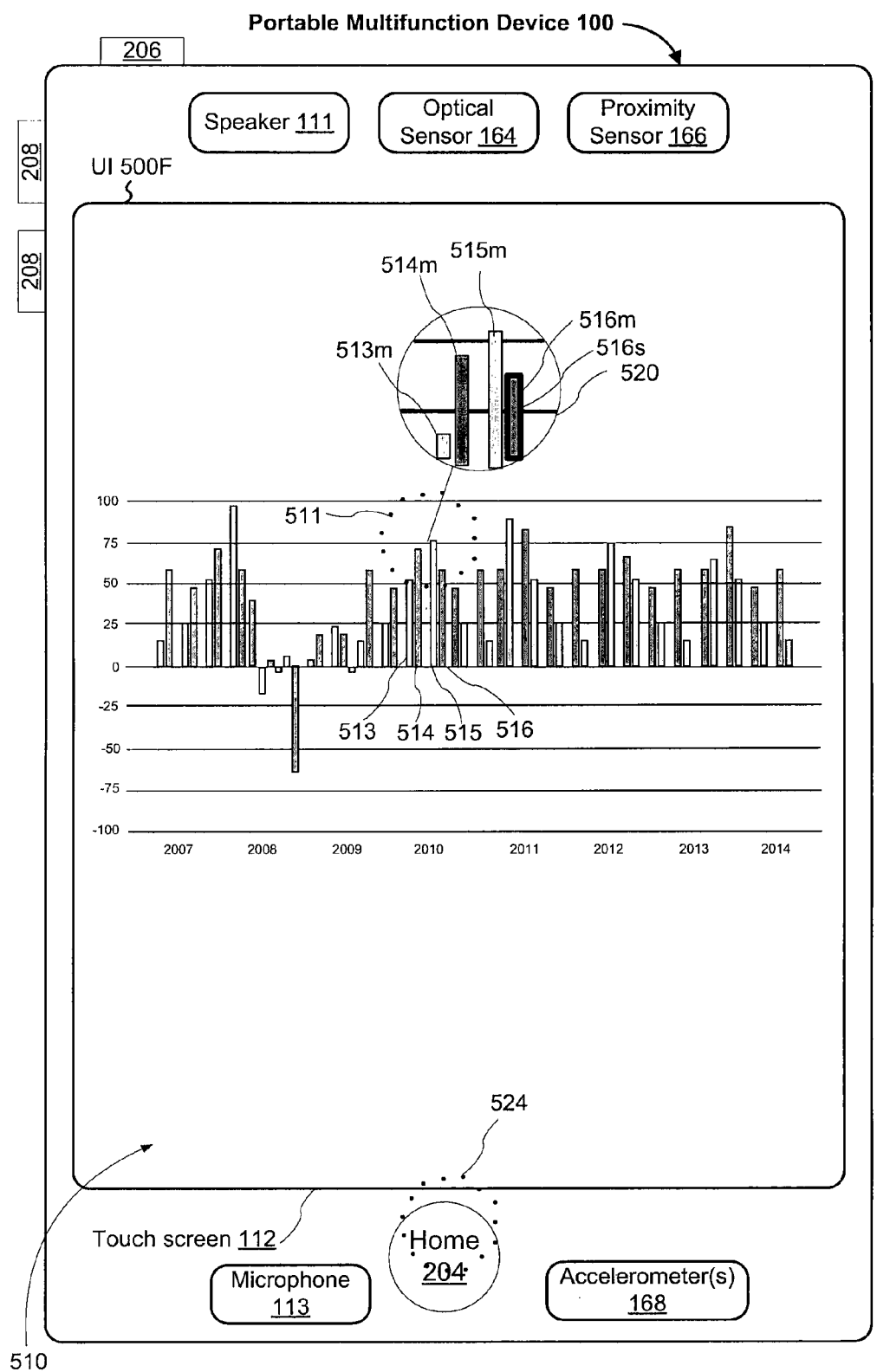
Figure 5G:
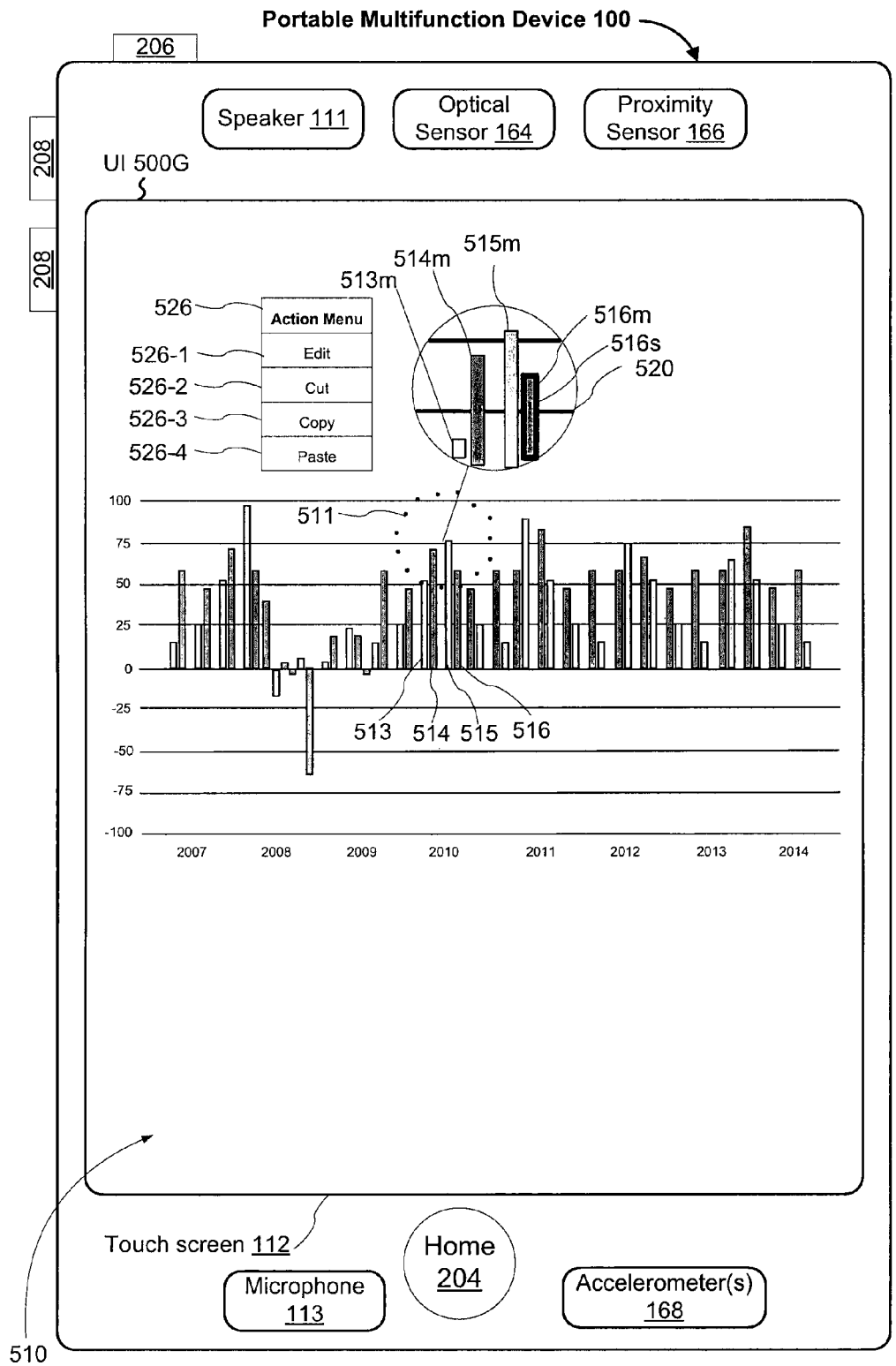
Figure 5H:
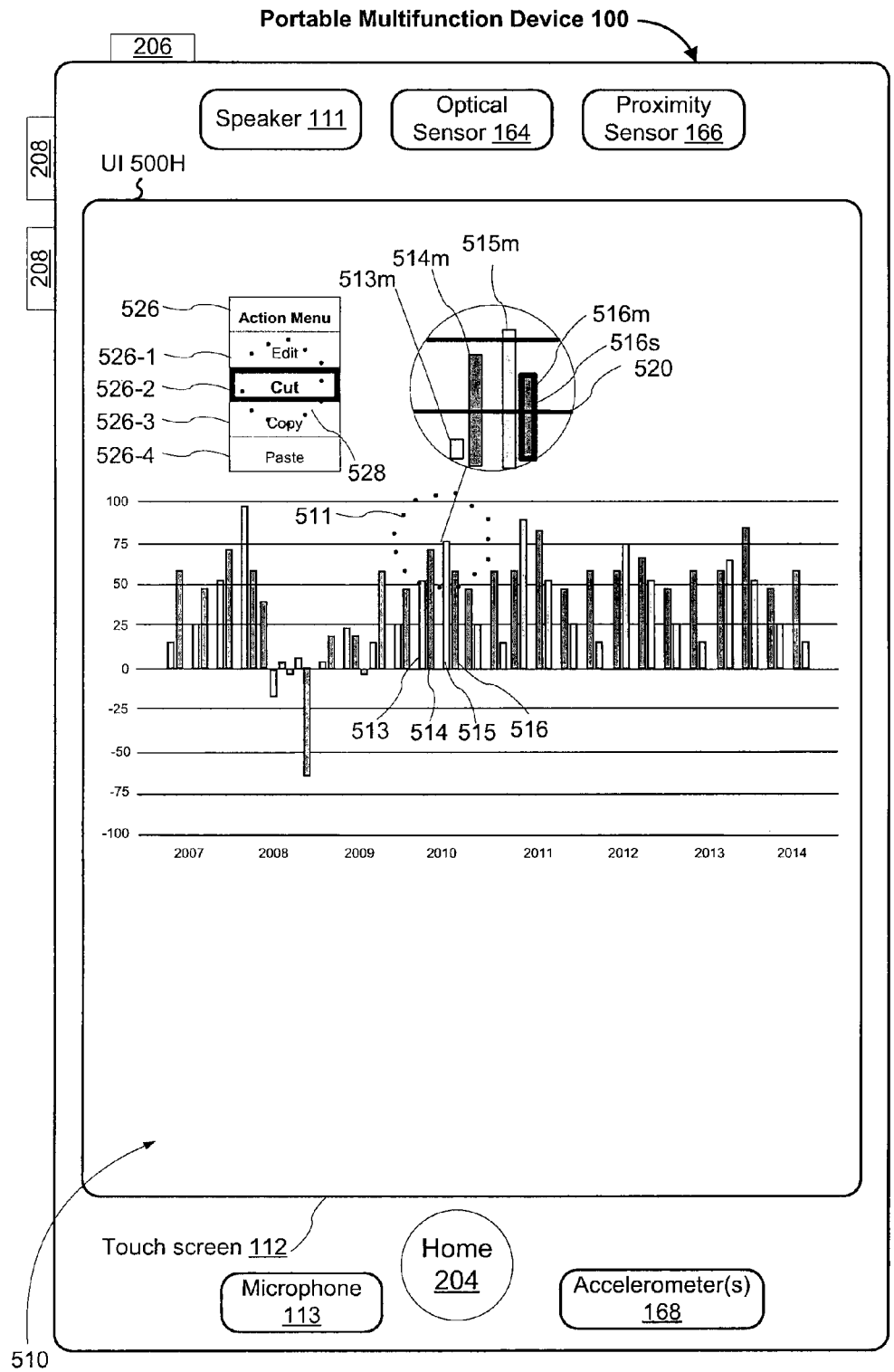
Figure 5I:
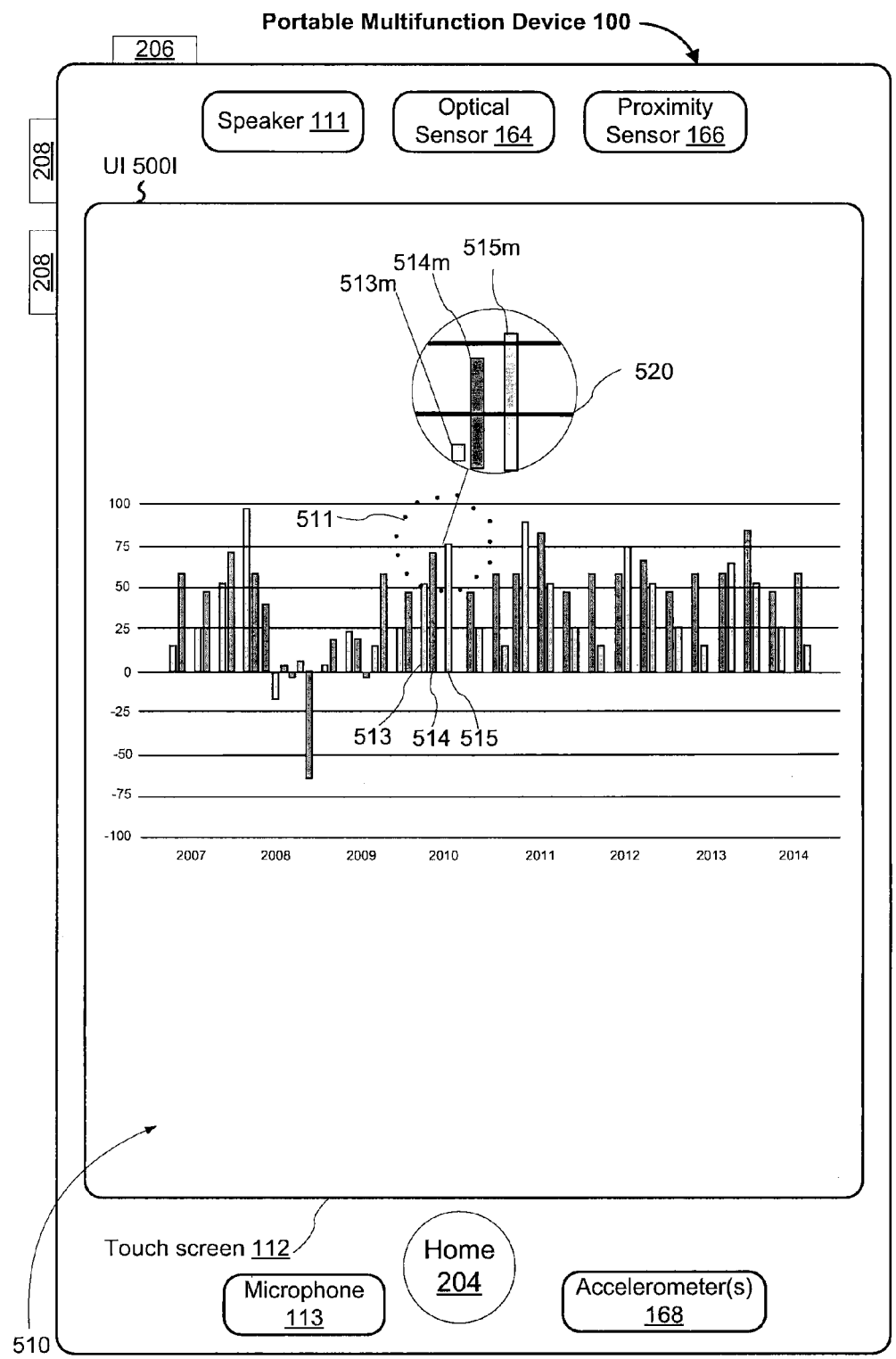
Figure 5J:
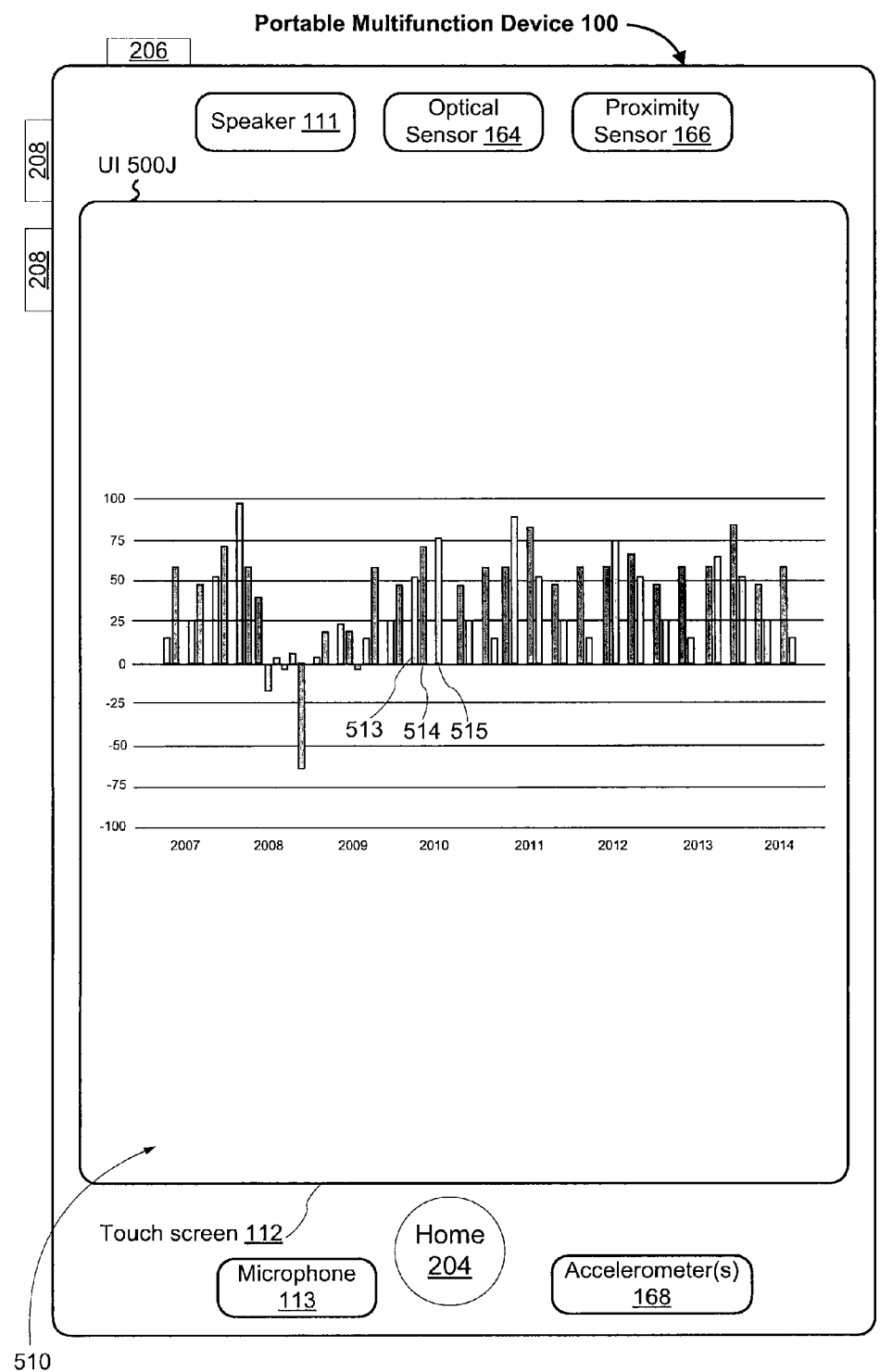
Figure 5K:
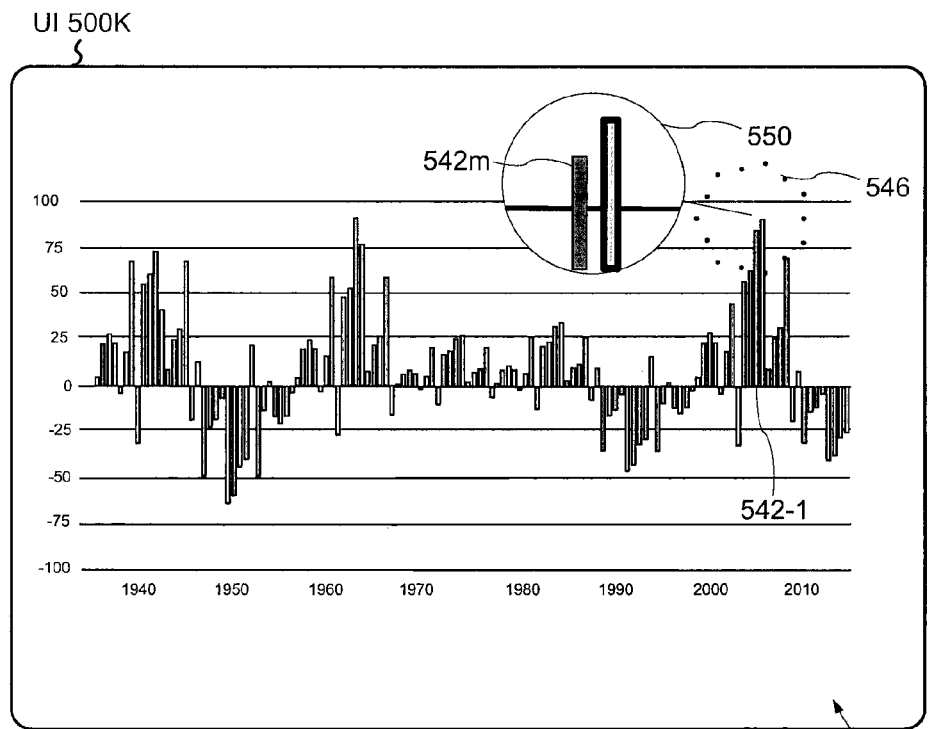
Figure 5L:
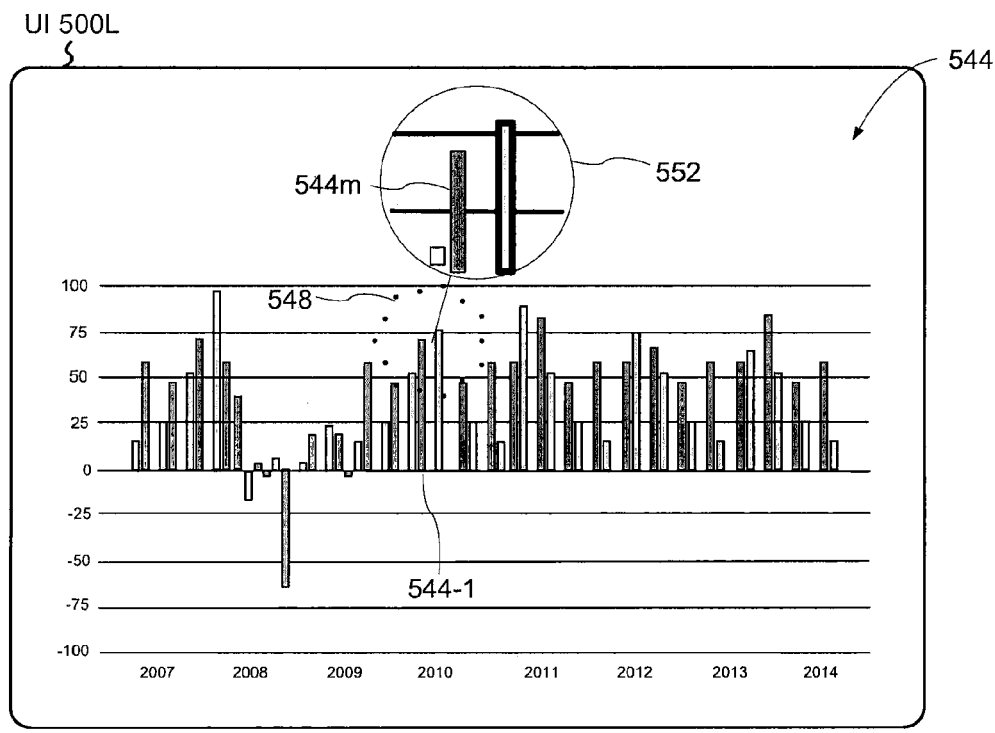

In some embodiments, the loupe uses a magnification factor that scales in accordance with the feature size of the one or more of the plurality of user interface elements (616) (FIGS. 5K-5L, where loupe 550 uses a magnification factor that is scaled higher than the magnification factor loupe 552 uses because the bar chart elements in first graph 542 have a smaller feature size than the bar chart elements in second graph 544).

In some embodiments, a variable magnification factor is used with the magnification loupe, based on the size of the displayed user interface element corresponding to the location of the point of contact on the touch-sensitive surface, i.e., when the user interface elements being targeted by the point of contact are relatively smaller, greater magnification is used, but when the user interface elements being targeted by the point of contact are relatively larger, less magnification is used. In some embodiments, the loupe displays an expanded localized area that includes a plateau region displaying a magnified portion of the user interface and/or displayed user interface elements. In some embodiments, the loupe displays a magnified portion of the user interface and/or displayed user interface elements, wherein the displayed magnified portion within the loupe is displayed at a consistent magnification factor across the loupe. In some embodiments, the loupe appears after a predetermined period of time has elapsed following detection of the point of contact on the touch-sensitive surface. In some embodiments, the appearance of the loupe is an animation. In some embodiments, the loupe is displayed as an animation of an expanding magnifying glass, wherein the animation occurs at a speed based on the size of the point of contact on the touch-sensitive surface, and may expand at a rate that increases when the size of the point of contact on the touch-sensitive surface increases.

In some embodiments, the loupe and/or magnified image is displayed at a location on the display corresponding to a location proximate to the point of contact by the user on the touch-sensitive surface (618).

In some embodiments, the magnified image is displayed at a respective location on the display corresponding to a location offset from the point of contact by the user on the touch-sensitive surface (620) (e.g., FIGS. 5K-5L, loupes 550 and 552 are displayed at respective locations offset from points of contact 546 and 548).

In some embodiments, while continuing to detect the point of contact by the user on the touch-sensitive surface, the device detects a movement of the point of contact by the user on the touch-sensitive surface, and in response to detecting the movement, the device continuously changes a respective displayed location of the loupe in accordance with the movement of the point of contact on the touch-sensitive surface (622) (e.g., FIGS. 5D-5E, loupe 520 moves to the right in accordance with movement 522 of single finger contact 511).

In some embodiments, while continuing to detect the point of contact by the user on the touch-sensitive surface, displaying within the loupe a selection indicia in conjunction with at least one of the plurality of user interface elements displayed within the loupe, the selection indicia corresponding to a selected user interface element displayed on the display at a location corresponding to the point of contact on the touch-sensitive surface (624) (e.g., FIG. 5D, selection indicia 514s highlights bar chart element 514m, where single finger contact 511 has selected bar chart element 514).

In some embodiments, the device detects movement of the point of contact by the user on the touch-sensitive surface, and in response to detecting the movement, the device updates the selection indicia to correspond to respective user interface elements in accordance with the movement of the point of contact when the point of contact on the touch-sensitive surface corresponds to respective locations of respective user interface elements displayed on the display (626) (e.g, FIG. 5E, in accordance with movement 522 of single finger contact 511, selection indicia 515s highlights bar chart element 515m, where selection indicia 515 was updated from 514s as depicted in FIG. 5D to 515s in FIG. 5E to highlight bar chart element 515).

In some embodiments, the device detects an action gesture on the touch-sensitive surface, and the device performs an action associated with the activation gesture on the selected user interface element (628) (e.g., FIG. 5F first portion of action gesture 524, pressing the home button 204; FIG. 5G, in response to detecting first portion of action gesture 524, action menu 526 is displayed; FIG. 5H second point of contact 528 over action menu option cut 526-2 is second portion of action gesture 524; FIG. 5I, in response to action gesture 524, bar code element 516 was cut from the user interface).

Figure 6C:
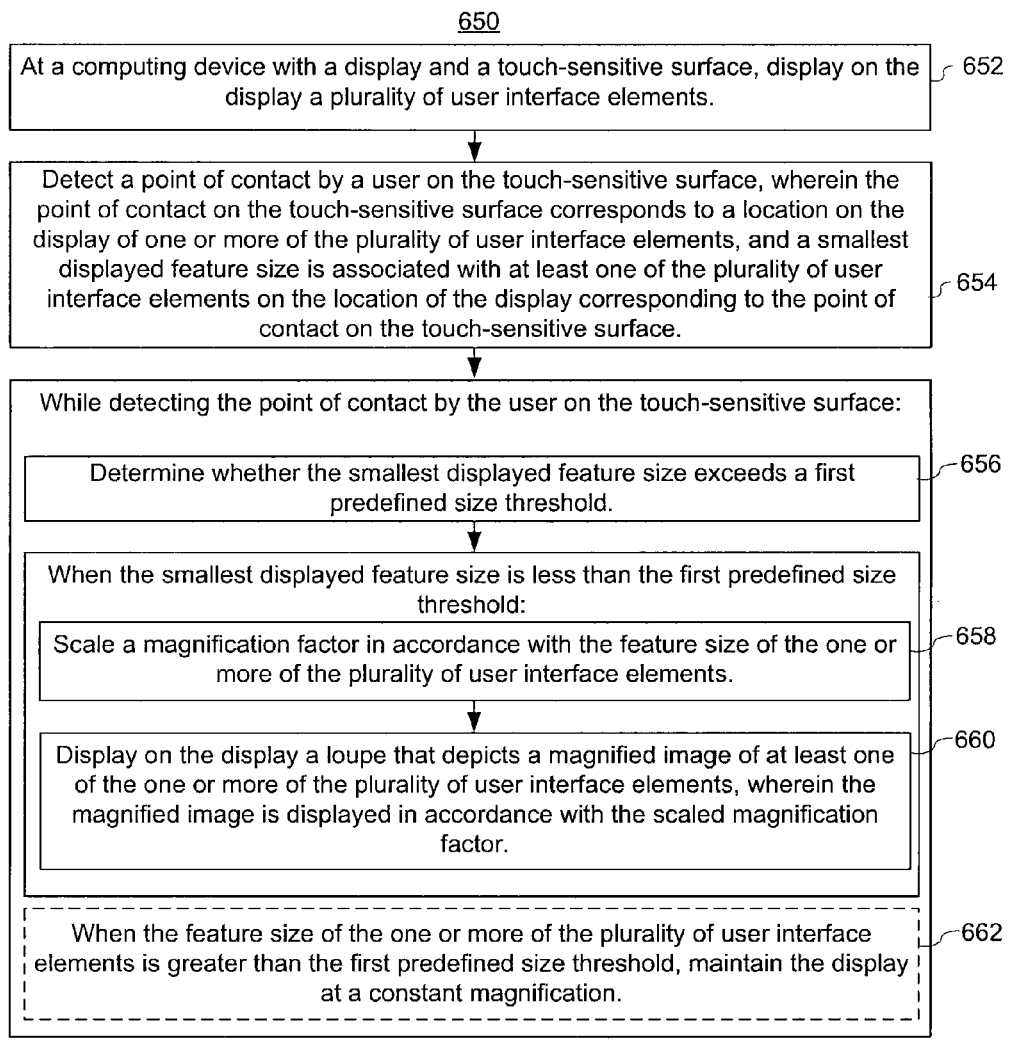

FIG. 6C is a flow diagram illustrating a method 650 of managing and manipulating user interface content and small user interface elements in accordance with some embodiments. The method 650 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface.

Some operations in method 650 may be combined and/or the order of some operations may be changed. Additionally, operations in method 650 may be combined with some operations in method 600 and/or the order of some combined operations may be changed.

As described below, the method 650 provides an intuitive way to manage and manipulate user interface content and small user interface elements. The method reduces the cognitive burden on a user when managing and manipulating user interface content and small user interface elements, thereby creating a more efficient human-machine interface. For battery-operated computing devices, enabling a user to manage and manipulate user interface content and small user interface elements faster and more efficiently conserves power and increases the time between battery charges.

The method 650 is performed at a computing device with a display and one or more user input devices adapted to detect user gestures (e.g., FIG. 5A portable multifunction device 100, FIG. 3 device 300). The device displays on the display a plurality of user interface elements (652) (e.g., FIG. 5A, electronic document 500 having a plurality of user interface elements, including bar chart elements 501, 502, and 503).

The device detects a point of contact by a user on the touch-sensitive surface, wherein the point of contact on the touch-sensitive surface corresponds to a location on the display of one or more of the plurality of user interface elements, and a smallest displayed feature size is associated with at least one of the plurality of user interface elements on the location of the display corresponding to the point of contact on the touch-sensitive surface (654) (e.g., FIG. 5A, single finger contact 505 corresponds to a location on the display of one or more of the plurality of user interface elements, i.e., bar chart element 503; bar chart elements 501, 502, and 503 have the smallest displayed feature size in electronic document 500, i.e., bar chart element 503 is width 507).

While detecting the point of contact by the user on the touch-sensitive surface, the device determines whether the smallest displayed feature size exceeds a first predefined size threshold (656) (e.g., FIG. 5A, bar chart element 503 is width 507, and is compared to predefined size threshold 509; FIG. 5C, bar chart element 512 is width 518, and is compared to predefined size threshold 509). As noted above, predefined size threshold can be any suitable value based on the screen resolution and the sensitivity of the touch-sensitive surface, e.g., a predefined size threshold may be defined in distance measurements such as ⅛ inch, ¼ inch, ⅜ inch, ½ inch (or fractions of centimeters), or any suitable distance; a predefined size threshold may also be defined in relation to the display in pixels, such as 7 pixels, 10 pixels, 12 pixels, 14 pixels, or any suitable value.

When the smallest displayed feature size is less than or equal to the first predefined size threshold, the device scales a magnification factor in accordance with the feature size of the one or more of the plurality of user interface elements (658) (e.g., FIGS. 5K-5L, magnification factors for use with loupes 550 and 552 are scaled in accordance with the feature size of the user interface elements being magnified, where the bar chart elements 542-1 and 544-1 are both smaller than predefined size threshold 509 illustrated in FIGS. 5A and 5C).

When the smallest displayed feature size is less than or equal to the first predefined size threshold, the device displays on the display a loupe that depicts a magnified image of at least one of the one or more of the plurality of user interface elements, wherein the magnified image is displayed in accordance with the scaled magnification factor (660) (e.g., FIGS. 5K-5L, loupes 550 and 552 display images magnified with magnification factors scaled in accordance with the feature size of the user interface elements being magnified).

In some embodiments, when the feature size of the one or more of the plurality of user interface elements is greater than the first predefined size threshold, maintaining the display at a constant magnification (662) (e.g., FIG. 5B, display of electronic document 500 is kept at a constant magnification, since, as illustrated in FIG. 5A, bar chart element 503 is width 507, which is greater than predefined size threshold 509).

The steps in the information processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a computing device with a display and a touch-sensitive surface:
displaying on the display a plurality of user interface elements;
detecting a point of contact by a user on the touch-sensitive surface, wherein:
the point of contact on the touch-sensitive surface corresponds to a location on the display of one or more of the plurality of user interface elements, and,
the one or more of the plurality of user interface elements have a feature size;
while detecting the point of contact by the user on the touch-sensitive surface:
determining whether the feature size of the one or more of the plurality of user interface elements exceeds a first predefined size threshold;
when the feature size of the one or more of the plurality of user interface elements is greater than the first predefined size threshold, maintaining the display at a constant magnification; and
when the feature size of the one or more of the plurality of user interface elements is less than the first predefined size threshold, displaying on the display a loupe that depicts a magnified image of at least one of the one or more of the plurality of user interface elements, wherein the magnified image corresponds to the area of the display corresponding to the location surrounding the point of contact on the touch-sensitive surface,
while continuing to detect the point of contact by the user on the touch-sensitive surface:
displaying within the loupe a selection indicia in conjunction with at least one of the plurality of user interface elements displayed within the loupe, the selection indicia corresponding to a selected user interface element displayed on the display at a location corresponding to the point of contact on the touch-sensitive surface;
detecting an action gesture on the touch-sensitive surface; and
performing an action associated with the action gesture on the selected user interface element.

2. The method of claim 1, further comprising:
while continuing to detect the point of contact by the user on the touch-sensitive surface:
detecting a movement of the point of contact by the user on the touch-sensitive surface; and
in response to detecting the movement, continuously changing a respective displayed location of the loupe in accordance with the movement of the point of contact on the touch-sensitive surface.

3. The method of claim 1, further comprising:
detecting movement of the point of contact by the user on the touch-sensitive surface; and
in response to detecting the movement, updating the selection indicia to correspond to respective user interface elements in accordance with the movement of the point of contact when the point of contact on the touch-sensitive surface corresponds to respective locations of respective user interface elements displayed on the display.

4. The method of claim 1, wherein the loupe uses a magnification factor that scales in accordance with the feature size of the one or more of the plurality of user interface elements.

5. The method of claim 1, wherein the display and the touch-sensitive surface comprise a touch-screen display.

6. The method of claim 1, wherein the plurality of user interface elements includes displayed features within an electronic document.

7. The method of claim 1, wherein the magnified image is displayed at a location on the display corresponding to a location proximate to the point of contact by the user on the touch-sensitive surface.

8. The method of claim 1, wherein the magnified image is displayed at a respective location on the display corresponding to a location offset from the point of contact by the user on the touch-sensitive surface.

9. A computing device, comprising:
a display;
a touch-sensitive surface;
one or more processors;
memory; and
one or more programs, wherein the one or more programs are stored in the memory and configured to be executed by the one or more processors, the one or more programs including instructions for:
displaying on the display a plurality of user interface elements;
detecting a point of contact by a user on the touch-sensitive surface, wherein:
the point of contact on the touch-sensitive surface corresponds to a location on the display of one or more of the plurality of user interface elements, and,
the one or more of the plurality of user interface elements have a feature size;
while detecting the point of contact by the user on the touch-sensitive surface:

determining whether the feature size of the one or more of the plurality of user interface elements exceeds a first predefined size threshold;

when the feature size of the one or more of the plurality of user interface elements is greater than the first predefined size threshold, maintaining the display at a constant magnification; and when the feature size of the one or more of the plurality of user interface elements is less than the first predefined size threshold, displaying on the display a loupe that depicts a magnified image of at least one of the one or more of the plurality of user interface elements, wherein the magnified image corresponds to the area of the display corresponding to the location surrounding the point of contact on the touch-sensitive surface, while continuing to detect the point of contact by the user on the touch-sensitive surface:

displaying within the loupe a selection indicia in conjunction with at least one of the plurality of user interface elements displayed within the loupe, the selection indicia corresponding to a selected user interface element displayed on the display at a location corresponding to the point of contact on the touch-sensitive surface;

detecting an action gesture on the touch-sensitive surface; and performing an action associated with the action gesture on the selected user interface element.

10. The computing device of claim 9, further comprising:
while continuing to detect the point of contact by the user on the touch-sensitive surface:
detecting a movement of the point of contact by the user on the touch-sensitive surface; and
in response to detecting the movement, continuously changing a respective displayed location of the loupe in accordance with the movement of the point of contact on the touch-sensitive surface.

11. The computing device of claim 9, further comprising:
detecting movement of the point of contact by the user on the touch-sensitive surface; and
in response to detecting the movement, updating the selection indicia to correspond to respective user interface elements in accordance with the movement of the point of contact when the point of contact on the touch-sensitive surface corresponds to respective locations of respective user interface elements displayed on the display.

12. The computing device of claim 9, wherein the loupe uses a magnification factor that scales in accordance with the feature size of the one or more of the plurality of user interface elements.

13. The computing device of claim 9, wherein the display and the touch-sensitive surface comprise a touch-screen display.

14. The computing device of claim 9, wherein the plurality of user interface elements includes displayed features within an electronic document.

15. The computing device of claim 9, wherein the magnified image is displayed at a location on the display corresponding to a location proximate to the point of contact by the user on the touch-sensitive surface.

16. The computing device of claim 9, wherein the magnified image is displayed at a respective location on the display corresponding to a location offset from the point of contact by the user on the touch-sensitive surface.

17. A graphical user interface on a computing device with a touch-sensitive surface and a display, the graphical user interface comprising:
a plurality of user interface elements;
wherein:
a point of contact by a user is detected on the touch-sensitive surface, wherein:
the point of contact on the touch-sensitive surface corresponds to a location on the display of one or more of the plurality of user interface elements, and,
the one or more of the plurality of user interface elements have a feature size;
while detecting the point of contact by the user on the touch-sensitive surface, and in response to detecting the point of contact:
the feature size of the one or more of the plurality of user interface elements is compared with a first predefined size threshold to determine whether the feature size of the one or more of the plurality of user interface elements exceeds the first predefined size threshold;
when the feature size of the one or more of the plurality of user interface elements is greater than the first predefined size threshold, the display is maintained at a constant magnification; and
when the feature size of the one or more of the plurality of user interface elements is less than the first predefined size threshold, a loupe is displayed on the display, the loupe depicting a magnified image of at least one of the one or more of the plurality of user interface elements, wherein the magnified image corresponds to the area of the display corresponding to the location surrounding the point of contact on the touch-sensitive surface,
while continuing to detect the point of contact by the user on the touch-sensitive surface:
displaying within the loupe a selection indicia in conjunction with at least one of the plurality of user interface elements displayed within the loupe, the selection indicia corresponding to a selected user interface element displayed on the display at a location corresponding to the point of contact on the touch-sensitive surface;
detecting an action gesture on the touch-sensitive surface; and
performing an action associated with the action gesture on the selected user interface element.

18. A non-transitory computer readable storage medium storing one or more programs, the one or more programs comprising instructions, which when executed by a computing device with a touch-sensitive surface and a display, cause the device to:
display on the display a plurality of user interface elements;
detect a point of contact by a user on the touch-sensitive surface, wherein:
the point of contact on the touch-sensitive surface corresponds to a location on the display of one or more of the plurality of user interface elements, and,
the one or more of the plurality of user interface elements have a feature size;
while detecting the point of contact by the user on the touch-sensitive surface:
determine whether the feature size of the one or more of the plurality of user interface elements exceeds a first predefined size threshold;
when the feature size of the one or more of the plurality of user interface elements is greater than the first predefined size threshold, maintain the display at a constant magnification; and when the feature size of the one or more of the plurality of user interface elements is less than the first predefined size threshold, display on the display a loupe that depicts a magnified image of at least one of the one or more of the plurality of user interface elements, wherein the magnified image corresponds to the area of the display corresponding to the location surrounding the point of contact on the touch-sensitive surface, while continuing to detect the point of contact by the user on the touch-sensitive surface:

displaying within the loupe a selection indicia in conjunction with at least one of the plurality of user interface elements displayed within the loupe, the selection indicia corresponding to a selected user interface element displayed on the display at a location corresponding to the point of contact on the touch-sensitive surface;

detecting an action gesture on the touch-sensitive surface; and performing an action associated with the action gesture on the selected user interface element.

19. A method, comprising:

at a computing device with a display and a touch-sensitive surface:

displaying on the display a plurality of user interface elements;

detecting a point of contact by a user on the touch-sensitive surface, wherein:

the point of contact on the touch-sensitive surface corresponds to a location on the display of one or more of the plurality of user interface elements, and a smallest displayed feature size is associated with at least one of the plurality of user interface elements on the location of the display corresponding to the point of contact on the touch-sensitive surface;

while detecting the point of contact by the user on the touch-sensitive surface:

determining whether the smallest displayed feature size exceeds a first predefined size threshold;

when the smallest displayed feature size is less than the first predefined size threshold:

scaling a magnification factor in accordance with the feature size of the one or more of the plurality of user interface elements; and displaying on the display a loupe that depicts a magnified image of at least one of the one or more of the plurality of user interface elements, wherein the magnified image is displayed in accordance with the scaled magnification factor.

20. The method of claim 19, when the feature size of the one or more of the plurality of user interface elements is greater than the first predefined size threshold, maintaining the display at a constant magnification.

\* \* \* \* \*